US012241229B2

(12) United States Patent
Itsuji

(10) Patent No.: US 12,241,229 B2
(45) Date of Patent: Mar. 4, 2025

(54) SHOVEL

(71) Applicant: SUMITOMO HEAVY INDUSTRIES, LTD., Tokyo (JP)

(72) Inventor: Yoshiyasu Itsuji, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/471,532

(22) Filed: Sep. 21, 2023

(65) Prior Publication Data

US 2024/0052595 A1 Feb. 15, 2024

Related U.S. Application Data

(63) Continuation of application No. PCT/JP2022/013512, filed on Mar. 23, 2022.

(30) Foreign Application Priority Data

Mar. 26, 2021 (JP) ................................ 2021-054225
Mar. 26, 2021 (JP) ................................ 2021-054359
Mar. 26, 2021 (JP) ................................ 2021-054360

(51) Int. Cl.
*E02F 9/22* (2006.01)
*F15B 11/024* (2006.01)
(Continued)

(52) U.S. Cl.
CPC .......... *E02F 9/2203* (2013.01); *E02F 9/2217* (2013.01); *F15B 11/024* (2013.01);
(Continued)

(58) Field of Classification Search
CPC ..... E02F 9/2228; E02F 9/2285; E02F 9/2217; E02F 9/2203
See application file for complete search history.

(56) References Cited

U.S. PATENT DOCUMENTS

2011/0020146 A1 1/2011 Akiyama et al.
2018/0238027 A1 8/2018 Kishida et al.
(Continued)

FOREIGN PATENT DOCUMENTS

JP 2017-057925 3/2017
WO 2009/123134 10/2009
(Continued)

OTHER PUBLICATIONS

International Search Report for PCT/JP2022/013512 mailed on Jun. 14, 2022.

*Primary Examiner* — Abiy Teka
(74) *Attorney, Agent, or Firm* — IPUSA, PLLC

(57) ABSTRACT

A shovel includes a plurality of hydraulic actuators each configured to move in response to a movement command; a pressure sensor configured to detect a pressure of hydraulic oil in each of the hydraulic actuators; a meter-in valve in correspondence with each of the hydraulic actuators; a meter-out valve in correspondence with each of the hydraulic actuators; and a controller having a plurality of output characteristics set for each of the hydraulic actuators. The controller is configured to calculate a required flow rate corresponding to the movement command, based on an output characteristic corresponding to the movement command from among the plurality of output characteristics.

19 Claims, 13 Drawing Sheets

(51) Int. Cl.
*F15B 11/16* (2006.01)
*F15B 13/02* (2006.01)

(52) U.S. Cl.
CPC .............. *F15B 11/16* (2013.01); *F15B 13/02* (2013.01); *E02F 9/2285* (2013.01); *E02F 9/2292* (2013.01); *E02F 9/2296* (2013.01); *F15B 2011/0243* (2013.01)

(56) References Cited

U.S. PATENT DOCUMENTS

| | | | | |
|---|---|---|---|---|
| 2019/0017247 | A1 | 1/2019 | Misaki | |
| 2021/0324609 | A1 * | 10/2021 | Takahashi | E02F 9/2285 |

FOREIGN PATENT DOCUMENTS

| | | | |
|---|---|---|---|
| WO | 2017/164169 | | 9/2017 |
| WO | WO-2020202309 | A1 * | 10/2020 |

* cited by examiner

SHOVEL

CROSS-REFERENCE TO RELATED APPLICATIONS

The present application is a continuation of International Application No. PCT/JP2022/013512, filed on Mar. 23, 2022 and designating the U.S., which claims priority to Japanese Patent Application No. 2021-054225, filed on Mar. 26, 2021, Japanese Patent Application No. 2021-054359, filed on Mar. 26, 2021, and Japanese Patent Application No. 2021-054360, filed on Mar. 26, 2021. The contents of these applications are incorporated herein by reference in their entireties.

BACKGROUND

Technical Field

The present disclosure relates to a shovel.

Description of Related Art

In the related art, a shovel serving as an excavator that excavates the ground is known. The shovel is configured to excavate soil by moving an excavation attachment attached to an upper swing structure.

The shovel is configured such that the opening area (meter-in opening area) of an oil passage connecting a hydraulic pump and a hydraulic actuator and the opening area (meter-out opening area) of an oil passage connecting the hydraulic actuator and a hydraulic oil tank can be simultaneously controlled by one spool valve when the hydraulic hydraulic actuator is moved.

SUMMARY

According to an embodiment of the present disclosure, a shovel includes a plurality of hydraulic actuators each configured to move in response to a movement command; a pressure sensor configured to detect a pressure of hydraulic oil in each of the hydraulic actuators; a meter-in valve in correspondence with each of the hydraulic actuators; a meter-out valve in correspondence with each of the hydraulic actuators; and a controller having a plurality of output characteristics set for each of the hydraulic actuators. The controller is configured to calculate a required flow rate corresponding to the movement command, based on an output characteristic corresponding to the movement command from among the plurality of output characteristics.

BRIEF DESCRIPTION OF THE DRAWINGS

Other objects and further features of the present invention will be apparent from the following detailed description when read in conjunction with the accompanying drawings, in which.

DETAILED DESCRIPTION

In the related art, the correspondence relationship between the displacement amount of the spool and the opening areas of the two oil passages is uniquely determined by the physical shape of the spool valve. Therefore, there is a possibility that the movement of the hydraulic actuator may be limited.

In view of the above, it is desirable to provide a shovel capable of more flexibly controlling the movement of a hydraulic actuator.

Figure 1:
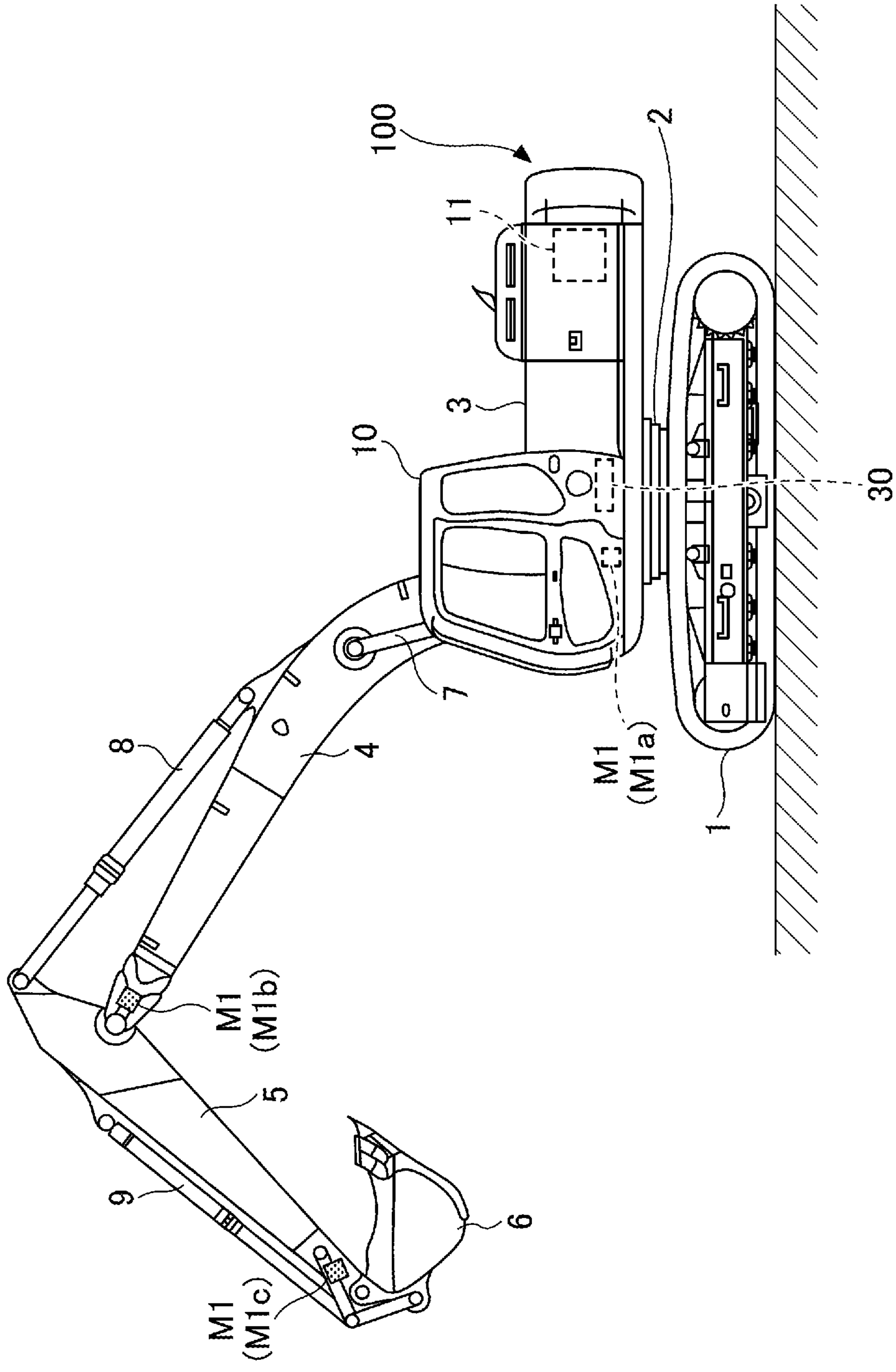
FIG. 1 is a side view of a shovel according to an embodiment of the present disclosure.

First, an excavator (a shovel 100) serving as a construction machine according to an embodiment of the present disclosure will be described with reference to FIG. 1. FIG. 1 is a side view of the shovel 100 according to the embodiment of the present disclosure. An upper swing structure 3 is swingably mounted on a lower traveling structure 1 of the shovel 100 illustrated in FIG. 1 via a swing mechanism 2. A boom 4 is attached to the upper swing structure 3. An arm 5 is attached to the tip of the boom 4. A bucket 6 is attached to the tip of the arm 5. The boom 4, the arm 5, and the bucket 6, which serve as work elements, constitute an excavation attachment that is an example of an attachment. The boom 4 is driven by a boom cylinder 7, the arm 5 is driven by an arm cylinder 8, and the bucket 6 is driven by a bucket cylinder 9. A cabin 10 is provided on the upper swing structure 3, and a power source such as an engine 11 is mounted on the upper swing structure 3. The engine 11 is a drive source of the shovel 100, and is, for example, a diesel engine that operates to maintain a predetermined rotational speed.

An orientation detection device M1 is attached to the excavation attachment. The orientation detection device M1 is an example of a detection device that detects information relating to excavation reaction. Specifically, the orientation detection device M1 is configured to detect the orientation of the excavation attachment. In the present embodiment, the orientation detection device M1 includes a boom angle sensor M1*a*, an arm angle sensor M1*b*, and a bucket angle sensor M1*c*.

The boom angle sensor M1*a* is a sensor that obtains a boom angle. For example, the boom angle sensor M1*a* includes a rotation angle sensor that detects the rotation angle of a boom foot pin, a stroke sensor that detects the length of stroke of the boom cylinder 7, and an inclination (acceleration) sensor that detects the inclination angle of the boom 4. The boom angle is, for example, an angle formed between the center line of the boom cylinder 7 and a predetermined virtual plane (for example, a horizontal plane). The same applies to the arm angle sensor M1*b* and the bucket angle sensor M1*c*.

Figure 2:
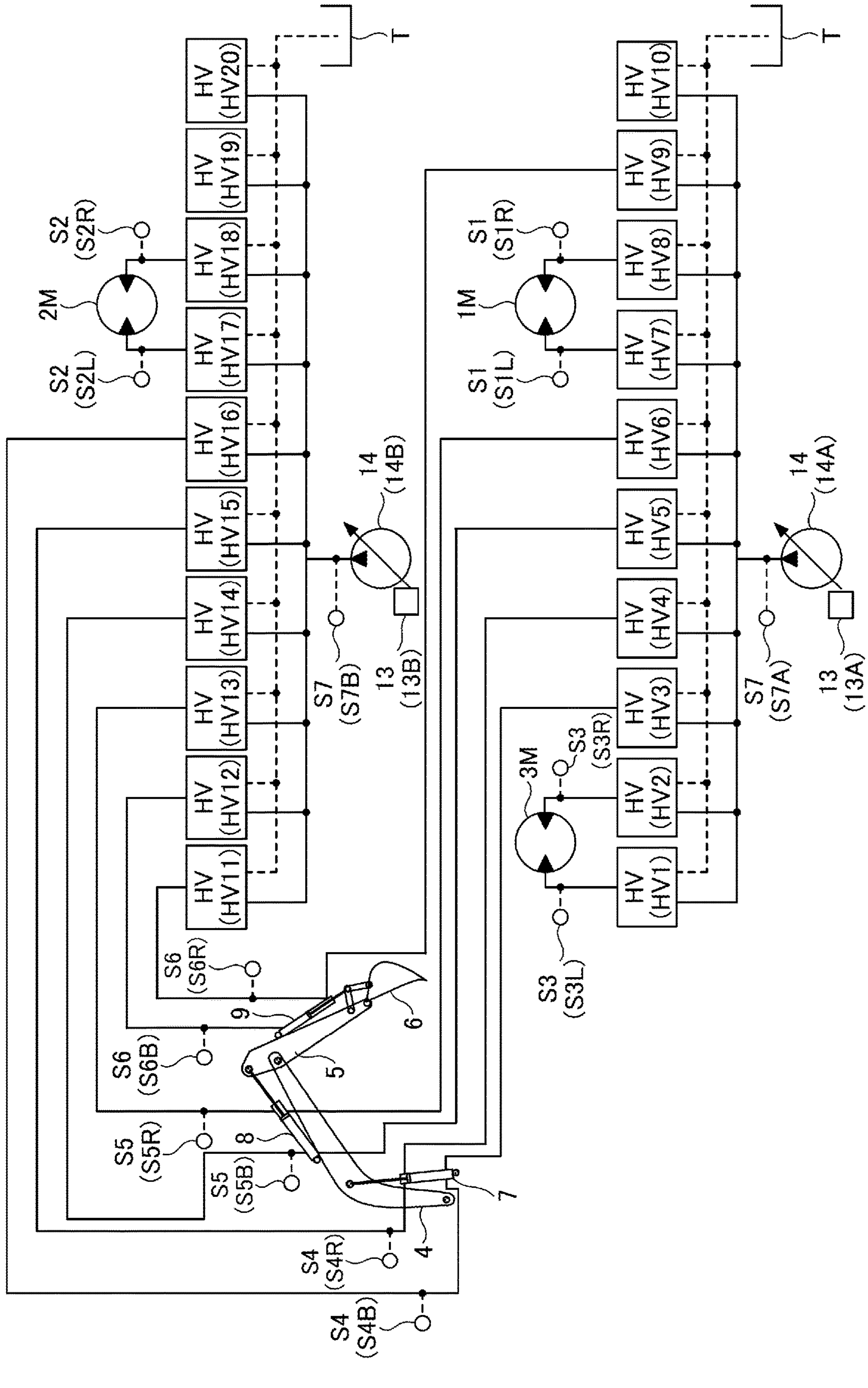
FIG. 2 is a schematic diagram of a hydraulic circuit installed in the shovel.
Figure 3:
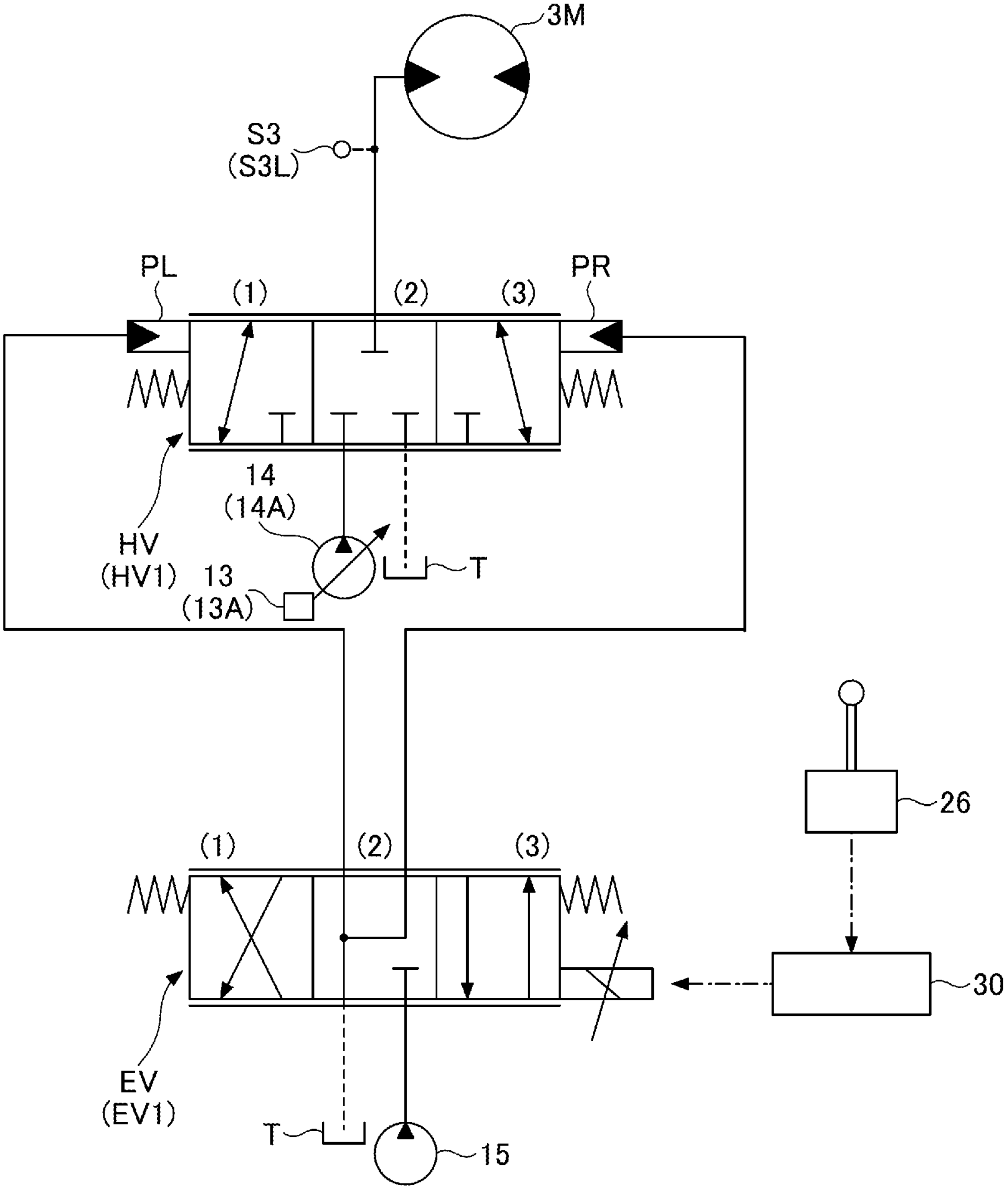
FIG. 3 is a diagram illustrating an example configuration of a hydraulic control valve.

Next, a hydraulic circuit installed in the shovel 100 will be described with reference to FIG. 2 and FIG. 3. FIG. 2 is a schematic diagram of the hydraulic circuit installed in the shovel 100. A basic system of the shovel 100 mainly includes a hydraulic pump 14, a pilot pump 15, an operation device 26, a controller 30, hydraulic control valves HV, and pressure sensors S1 to S7. FIG. 3 is a diagram illustrating an example configuration of a hydraulic control valve HV1 that is one of the hydraulic control valves HV.

The hydraulic pump 14 is a hydraulic pump that supplies hydraulic oil to the hydraulic control valves HV via hydraulic oil lines. In the example illustrated in FIG. 2, the hydraulic pump 14 is a swash plate variable displacement hydraulic pump. The hydraulic pump 14 is driven by the engine 11, and the input shaft of the hydraulic pump 14 is connected to the output shaft of the engine 11. In the swash plate variable displacement hydraulic pump, the stroke length of a piston determining the displacement volume changes in accordance with a change in the swash plate tilt angle, and the discharge quantity per rotation changes. The swash plate tilt angle is controlled by a regulator 13. The regulator 13 changes the swash plate tilt angle in accordance with a change in a control current from the controller 30. For example, the regulator 13 is configured to increase the discharge quantity of the hydraulic pump 14 by increasing the swash plate tilt angle according to the increase in the control current. Specifically, the hydraulic pump 14 includes a first hydraulic pump 14A and a second hydraulic pump 14B. The regulator 13 includes a first regulator 13A and a second regulator 13B.

In the example illustrated in FIG. 2 and FIG. 3, the boom cylinder 7 and the arm cylinder 8 are driven by hydraulic oil discharged from the first hydraulic pump 14A and hydraulic oil discharged from the second hydraulic pump 14B. When the bucket cylinder 9 retracts, the bucket cylinder 9 is driven by hydraulic oil discharged from the first hydraulic pump 14A and hydraulic oil discharged from the second hydraulic pump 14B; however, when the bucket cylinder 9 extends, the bucket cylinder 9 is driven by hydraulic oil discharged from only the second hydraulic pump 14B.

The pressure sensors S1 to S7 are devices that detect the pressure of hydraulic oil in parts of the hydraulic circuit.

The pressure sensor S1 is a device that detects the pressure of hydraulic oil relating to the movement of a left traveling hydraulic motor 1M. Specifically, the pressure sensor S1 includes a pressure sensor S1L and a pressure sensor S1R. The pressure sensor S1L detects the pressure of hydraulic oil in a first port (left port) of the left traveling hydraulic motor 1M. The pressure sensor S1R detects the pressure (right port pressure) of hydraulic oil in a second port (right port) of the left traveling hydraulic motor 1M.

The pressure sensor S2 is a device that detects the pressure of hydraulic oil relating to the movement of a right traveling hydraulic motor 2M. Specifically, the pressure sensor S2 includes a pressure sensor S2L and a pressure sensor S2R. The pressure sensor S2L detects the pressure of hydraulic oil in a first port (left port) of the right traveling hydraulic motor 2M. The pressure sensor S2R detects the pressure of hydraulic oil in a second port (right port) of the right traveling hydraulic motor 2M.

The pressure sensor S3 is a device that detects the pressure of hydraulic oil relating to the movement of a swing hydraulic motor 3M. Specifically, the pressure sensor S3 includes a pressure sensor S3L and a pressure sensor S3R. The pressure sensor S3L detects the pressure of hydraulic oil in a first port (left port) of the swing hydraulic motor 3M. The pressure sensor S3R detects the pressure of hydraulic oil in a second port (right port) of the swing hydraulic motor 3M.

The pressure sensor S4 is a device that detects the pressure of hydraulic oil relating to the movement of the boom 4. Specifically, the pressure sensor S4 includes a pressure sensor S4B and a pressure sensor S4R. The pressure sensor S4B detects a boom bottom pressure that is the pressure of a bottom-side oil chamber of the boom cylinder 7. The pressure sensor S4R detects a boom rod pressure that is the pressure of hydraulic oil in a rod-side oil chamber of the boom cylinder 7.

The pressure sensor S5 is a device that detects the pressure of hydraulic oil relating to the movement of the arm 5. Specifically, the pressure sensor S5 includes a pressure sensor S5B and a pressure sensor S5R. The pressure sensor S5B detects an arm bottom pressure that is the pressure of hydraulic oil in a bottom-side oil chamber of the arm cylinder 8. The pressure sensor S5R detects an arm rod pressure that is the pressure of hydraulic oil in a rod-side oil chamber of the arm cylinder 8.

The pressure sensor S6 is a device that detects the pressure of hydraulic oil relating to the movement of the bucket 6. Specifically, the pressure sensor S6 includes a pressure sensor S6B and a pressure sensor S6R. The pressure sensor S6B detects a bucket bottom pressure that is the pressure of hydraulic oil in a bottom-side oil chamber of the bucket cylinder 9. The pressure sensor S6R detects a bucket rod pressure that is the pressure of hydraulic oil in a rod-side oil chamber of the bucket cylinder 9.

The pressure sensor S7 is a device (discharge pressure sensor) that detects the discharge pressure of the hydraulic pump 14. Specifically, the pressure sensor S7 includes a pressure sensor S7A and a pressure sensor S7B. The pressure sensor S7A detects the discharge pressure of the first hydraulic pump 14A. The pressure sensor S7B detects the discharge pressure of the second hydraulic pump 14B.

The hydraulic control valves HV are configured to control the flows of hydraulic oil supplied to hydraulic actuators. In the present embodiment, the hydraulic control valves HV include hydraulic control valves HV1 to HV20 having the same structure and individually controlled by solenoid valves EV. The hydraulic control valves HV are configured to selectively supply hydraulic oil, received from the hydraulic pump 14 via hydraulic oil lines, to one or more hydraulic actuators in accordance with a change in pressure (pilot pressure) that corresponds to the operation direction and the operation amount of the operation device 26. The hydraulic actuators include, for example, the boom cylinder 7, the arm cylinder 8, the bucket cylinder 9, the left traveling hydraulic motor 1M, the right traveling hydraulic motor 2M, the swing hydraulic motor 3M, and the like.

The hydraulic control valve HV1 is disposed in a conduit connected to the first port (left port) of the swing hydraulic motor 3M, and is configured to selectively connect the first port (left port) of the swing hydraulic motor 3M to the first hydraulic pump 14A or a hydraulic oil tank T. The hydraulic control valve HV1 functions as a meter-in valve associated with the swing hydraulic motor 3M when the swing hydraulic motor 3M rotates in a first direction, and functions as a meter-out valve associated with the swing hydraulic motor 3M when the swing hydraulic motor 3M rotates in a second direction opposite to the first direction.

The hydraulic control valve HV2 is disposed in a conduit connected to the second port (right port) of the swing hydraulic motor 3M, and is configured to selectively connect the second port (right port) of the swing hydraulic motor 3M to the first hydraulic pump 14A or the hydraulic oil tank T. The hydraulic control valve HV2 functions as a meter-out valve associated with the swing hydraulic motor 3M when the swing hydraulic motor 3M rotates in the first direction, and functions as a meter-in valve associated with the swing hydraulic motor 3M when the swing hydraulic motor 3M rotates in the second direction.

The hydraulic control valve HV3 is disposed in a conduit connected to the bottom-side oil chamber of the boom cylinder 7, and is configured to selectively connect the bottom-side oil chamber of the boom cylinder 7 to the first hydraulic pump 14A or the hydraulic oil tank T. The hydraulic control valve HV3 functions as a meter-in valve associated with the boom cylinder 7 when the boom cylinder 7 extends, and functions as a meter-out valve associated with the boom cylinder 7 when the boom cylinder 7 retracts.

The hydraulic control valve HV4 is disposed in a conduit connected to the rod-side oil chamber of the boom cylinder 7, and is configured to selectively connect the rod-side oil chamber of the boom cylinder 7 to the first hydraulic pump 14A or the hydraulic oil tank T. The hydraulic control valve HV4 functions as a meter-out valve associated with the boom cylinder 7 when the boom cylinder 7 extends, and functions as a meter-in valve associated with the boom cylinder 7 when the boom cylinder 7 retracts.

The hydraulic control valve HV5 is disposed in a conduit connected to the bottom-side oil chamber of the arm cylinder 8, and is configured to selectively connect the bottom-side oil chamber of the arm cylinder 8 to the first hydraulic pump 14A or the hydraulic oil tank T. The hydraulic control valve HV5 functions as a meter-in valve associated with the arm cylinder 8 when the arm cylinder 8 extends, and functions as a meter-out valve associated with the arm cylinder 8 when the arm cylinder 8 retracts.

The hydraulic control valve HV6 is disposed in a conduit connected to the rod-side oil chamber of the arm cylinder 8, and is configured to selectively connect the rod-side oil chamber of the arm cylinder 8 to the first hydraulic pump 14A or the hydraulic oil tank T. The hydraulic control valve HV6 functions as a meter-out valve associated with the arm cylinder 8 when the arm cylinder 8 extends, and functions as a meter-in valve associated with the arm cylinder 8 when the arm cylinder 8 retracts.

The hydraulic control valve HV7 is disposed in a conduit connected to the first port (left port) of the left traveling hydraulic motor 1M, and is configured to selectively connect the first port (left port) of the left traveling hydraulic motor 1M to the first hydraulic pump 14A or the hydraulic oil tank T. The hydraulic control valve HV7 functions as a meter-in valve associated with the left traveling hydraulic motor 1M when the left traveling hydraulic motor 1M rotates in the first direction, and functions as a meter-out valve associated with the left traveling hydraulic motor 1M when the left traveling hydraulic motor 1M rotates in the second direction opposite to the first direction.

The hydraulic control valve HV8 is disposed in a conduit connected to the second port (right port) of the left traveling hydraulic motor 1M, and is configured to selectively connect the second port (right port) of the left traveling hydraulic motor 1M to the first hydraulic pump 14A or the hydraulic oil tank T. The hydraulic control valve HV8 functions as a meter-out valve associated with the left traveling hydraulic motor 1M when the left traveling hydraulic motor 1M rotates in the first direction, and functions as a meter-in valve when the left traveling hydraulic motor 1M rotates in the second direction.

The hydraulic control valve HV9 is disposed in a conduit connected to the rod-side oil chamber of the bucket cylinder 9, and is configured to selectively connect the rod-side oil chamber of the bucket cylinder 9 to the first hydraulic pump 14A or the hydraulic oil tank T. The hydraulic control valve HV9 functions as a meter-out valve associated with the bucket cylinder 9 when the bucket cylinder 9 extends, and functions as a meter-in valve associated with the bucket cylinder 9 when the bucket cylinder 9 retracts.

The hydraulic control valve HV10 is disposed in a conduit connected to an oil chamber of a hydraulic actuator, and is configured to selectively connect the hydraulic actuator to the first hydraulic pump 14A or the hydraulic oil tank T. The hydraulic control valve HV10 is configured to function as a meter-in valve or a meter-out valve as necessary. The oil chamber of the hydraulic actuator may be the bottom-side oil chamber of the bucket cylinder 9.

The hydraulic control valve HV11 is disposed in a conduit connected to the rod-side oil chamber of the bucket cylinder 9, and is configured to selectively connect the rod-side oil chamber of the bucket cylinder 9 to the second hydraulic pump 14B or a hydraulic oil tank T. The hydraulic control valve HV11 functions as a meter-out valve associated with the bucket cylinder 9 when the bucket cylinder 9 extends, and functions as a meter-in valve associated with the bucket cylinder 9 when the bucket cylinder 9 retracts.

The hydraulic control valve HV12 is disposed in a conduit connected to the bottom-side oil chamber of the bucket cylinder 9, and is configured to selectively connect the bottom-side oil chamber of the bucket cylinder 9 to the second hydraulic pump 14B or the hydraulic oil tank T. The hydraulic control valve HV12 functions as a meter-in valve associated with the bucket cylinder 9 when the bucket cylinder 9 extends, and functions as a meter-out valve associated with the bucket cylinder 9 when the bucket cylinder 9 retracts.

The hydraulic control valve HV13 is disposed in a conduit connected to the rod-side oil chamber of the arm cylinder 8, and is configured to selectively connect the rod-side oil chamber of the arm cylinder 8 to the second hydraulic pump 14B or the hydraulic oil tank T. The hydraulic control valve HV13 functions as a meter-out valve associated with the arm cylinder 8 when the arm cylinder 8 extends, and functions as a meter-in valve associated with the arm cylinder 8 when the arm cylinder 8 retracts.

The hydraulic control valve HV14 is disposed in a conduit connected to the bottom-side oil chamber of the arm cylinder 8, and is configured to selectively connect the bottom-side oil chamber of the arm cylinder 8 to the second hydraulic pump 14B or the hydraulic oil tank T. The hydraulic control valve HV14 functions as a meter-in valve associated with the arm cylinder 8 when the arm cylinder 8 extends, and functions as a meter-out valve associated with the arm cylinder 8 when the arm cylinder 8 retracts.

The hydraulic control valve HV15 is disposed in a conduit connected to the rod-side oil chamber of the boom cylinder 7, and is configured to selectively connect the rod-side oil chamber of the boom cylinder 7 to the second hydraulic pump 14B or the hydraulic oil tank T. The hydraulic control valve HV15 functions as a meter-out valve associated with the boom cylinder 7 when the boom cylinder 7 extends, and functions as a meter-in valve associated with the boom cylinder 7 when the boom cylinder 7 retracts.

The hydraulic control valve HV16 is disposed in a conduit connected to the bottom-side oil chamber of the boom cylinder 7, and is configured to selectively connect the bottom-side oil chamber of the boom cylinder 7 to the second hydraulic pump 14B or the hydraulic oil tank T. The hydraulic control valve HV16 functions as a meter-in valve associated with the boom cylinder 7 when the boom cylinder 7 extends, and functions as a meter-out valve associated with the boom cylinder 7 when the boom cylinder 7 retracts.

The hydraulic control valve HV17 is disposed in a conduit connected to the first port (left port) of the right traveling hydraulic motor 2M, and is configured to selectively connect the first port (left port) of the right traveling hydraulic motor 2M to the second hydraulic pump 14B or the hydraulic oil tank T. The hydraulic control valve HV17 functions as a meter-in valve associated with the right traveling hydraulic motor 2M when the right traveling hydraulic motor 2M rotates in the first direction, and functions as a meter-out valve associated with the right traveling hydraulic motor 2M when the right traveling hydraulic motor 2M rotates in the second direction opposite to the first direction.

The hydraulic control valve HV18 is disposed in a conduit connected to the second port (right port) of the right traveling hydraulic motor 2M, and is configured to selectively connect the second port (right port) of the right traveling hydraulic motor 2M to the second hydraulic pump 14B or the hydraulic oil tank T. The hydraulic control valve HV18 functions as a meter-out valve associated with the right traveling hydraulic motor 2M when the right traveling hydraulic motor 2M rotates in the first direction, and functions as a meter-in valve associated with the right traveling hydraulic motor 2M when the right traveling hydraulic motor 2M rotates in the second direction The hydraulic control valve HV19 is disposed in a conduit connected to a hydraulic actuator other than the above-described hydraulic actuators, and is configured to selectively connect the hydraulic actuator to the second hydraulic pump 14B or the hydraulic oil tank T. The hydraulic control valve HV19 is configured to function as a meter-in valve or a meter-out valve as necessary.

The hydraulic control valve HV20 is disposed in a conduit connected to a hydraulic actuator other than the above-described hydraulic actuators, and is configured to selectively connect the hydraulic actuator to the second hydraulic pump 14B or the hydraulic oil tank T. The hydraulic control valve HV20 is configured to function as a meter-in valve or a meter-out valve as necessary. The pilot pump 15 is a hydraulic pump that supplies hydraulic oil to various hydraulic control devices such as the operation device 26 via pilot lines. In the example illustrated in FIG. 3, the pilot pump 15 is a fixed capacity hydraulic pump and is driven by the engine 11. The input shaft of the pilot pump 15 is connected to the output shaft of the engine 11.

The operation device 26 is a device used by an operator to operate the hydraulic actuators. The operation device 26 is, for example, an operation lever, an operation pedal, or the like. In the example illustrated in FIG. 3, the operation device 26 is an electric-type operation device, and outputs, to the controller 30, information relating to the operation direction and the operation amount of the operation device 26 as an electric signal (a movement command value). The controller 30 can adjust the magnitude of a pilot pressure acting on a hydraulic control valve HV by adjusting the opening area of a solenoid valve EV in accordance with the electric signal received from the operation device 26. Further, the operation device 26 includes a left operation lever configured to operate the swing hydraulic motor 3M and the arm cylinder 8, and includes a right operation lever configured to operate the boom cylinder 7 and the bucket cylinder 9.

The controller 30 is a control device configured to control the shovel 100. In the present embodiment, the controller 30 is configured with a computer including a CPU, a volatile storage medium, a non-volatile storage medium, and the like. The CPU of the controller 30 reads out programs corresponding to various functions from the non-volatile storage medium, loads the programs in the volatile storage medium, and executes the programs to implement the functions corresponding to the respective programs.

For example, the controller 30 implements a function to control the discharge quantity of the hydraulic pump 14. More specifically, the controller 30 changes the magnitude of the control current with respect to the regulator 13, and controls the discharge quantity of the hydraulic pump 14 via the regulator 13.

Referring now to FIG. 3, a hydraulic control valve HV will be described in detail. The following description relates to the hydraulic control valve HV1; however, the following description applies to each of the hydraulic control valve HV2 to the hydraulic control valve HV20.

The hydraulic control valve HV1 is a three-port, three-position spool valve. In FIG. 3, (1) indicates a first position (first valve position), (2) indicates a second position (second valve position), and (3) indicates a third position (third valve position).

When the hydraulic control valve HV1 is positioned in the second position that is a neutral position, the hydraulic control valve HV1 cuts off communication between the left port of the swing hydraulic motor 3M and each of the first hydraulic pump 14A and the hydraulic oil tank T. That is, when the hydraulic control valve HV1 is positioned in the second position that is the neutral position, the hydraulic control valve HV1 is configured such that the opening area of a first oil passage, connecting the left port of the swing hydraulic motor 3M and the first hydraulic pump 14A, and the opening area of a second oil passage, connecting the left port of the swing hydraulic motor 3M and the hydraulic oil tank, become minimum (zero).

Further, when the hydraulic control valve HV1 is positioned in the first position, the hydraulic control valve HV1 causes the left port of the swing hydraulic motor 3M to communicate with the first hydraulic pump 14A. When the hydraulic control valve HV1 is positioned in the third position, the hydraulic control valve HV1 causes the left port of the swing hydraulic motor 3M to communicate with the hydraulic oil tank T. That is, the hydraulic control valve HV1 is configured such that the opening area of the first oil passage becomes maximum when the hydraulic control valve HV1 is positioned in the first position, and the opening area of the second oil passage becomes maximum when the hydraulic control valve HV1 is positioned in the third position.

Further, when the hydraulic control valve HV1 is an intermediate position between the second position and the first position, the hydraulic control valve HV1 is configured such that the opening area of the first oil passage increases as the hydraulic control valve HV1 moves away from the neutral position. In addition, when the hydraulic control valve HV1 is an intermediate position between the second position and the third position, the hydraulic control valve HV1 is configured such that the opening area of the second oil passage increases as the hydraulic control valve HV1 moves away from the neutral position.

Further, the hydraulic control valve HV1 is configured to move to the right when a pilot pressure (left pilot pressure) in a left pilot port PL becomes larger than a pilot pressure (right pilot pressure) in a right pilot port PR, and move to the left when the left pilot pressure becomes smaller than the right pilot pressure, and return to the neutral position when the left pilot pressure and the right pilot pressure become equal to each other.

The left pilot pressure and the right pilot pressure are controlled by a solenoid valve EV1. The solenoid valve EV1 is one of the solenoid valves EV, and corresponds to the hydraulic control valve HV1. The solenoid valves EV include solenoid valves EV2 to EV20 corresponding to the hydraulic control valves HV2 to HV20.

Specifically, the solenoid valve EV1 is a device configured to adjust the pilot pressures, and is disposed between the hydraulic control valve HV1 and the pilot pump 15. In the example illustrated in FIG. 3, the solenoid valve EV1 operates in response to a current command from the controller 30. Basically, the solenoid valve EV1 is configured to operate the hydraulic control valve HV1 in accordance with details of an operation input with respect to the operation device 26. Typically, the solenoid valve EV1 is configured to increase the amount of movement of the hydraulic control valve HV1 as the operation amount of the operation device 26 increases. In addition, the solenoid valve EV1 is configured to forcibly operate the hydraulic control valve HV1 regardless of details of an operation input with respect to the operation device 26.

Specifically, the solenoid valve EV1 is a four-port, three-position spool valve. In FIG. 3, (1) indicates a first position (first valve position), (2) indicates a second position (second valve position), and (3) indicates a third position (third valve position).

When the solenoid valve EV1 is positioned in the second position that is a neutral position, the solenoid valve EV1 causes each of the left pilot port PL and the right pilot port PR of the hydraulic control valve HV1 to communicate with the hydraulic oil tank T, and cuts off communication between each of the left pilot port PL and the right pilot port PR with the pilot pump 15. At this time, both the left pilot pressure and the right pilot pressure acting on the hydraulic control valve HV1 become the hydraulic oil tank pressure (atmospheric pressure), and thus, the hydraulic control valve HV1 returns to the neutral position.

Further, when the solenoid valve EV1 is positioned in the first position, the solenoid valve EV1 causes the left pilot port PL to communicate with the pilot pump 15 and causes the right pilot port PR to communicate with the hydraulic oil tank T. That is, when the solenoid valve EV1 is positioned in the first position, the solenoid valve EV1 is configured such that the opening area of a first oil passage connecting the left pilot port PL and the pilot pump 15 becomes maximum, and the opening area of a second oil passage connecting the right pilot port PR and the hydraulic oil tank T becomes maximum. At this time, the left pilot pressure acting on the hydraulic control valve HV1 becomes larger than the right pilot pressure. Thus, the hydraulic control valve HV1 moves to the right.

Further, when the solenoid valve EV1 is positioned in the third position, the solenoid valve EV1 causes the left pilot port PL to communicate with the hydraulic oil tank T and causes the right pilot port PR to communicate with the pilot pump 15. That is, when the solenoid valve EV1 is positioned in the third position, the solenoid valve EV1 is configured such that the opening area of a third oil passage connecting the left pilot port PL and the hydraulic oil tank T becomes maximum, and the opening area of a fourth oil passage connecting the right pilot port PR and the pilot pump 15 becomes maximum. At this time, the left pilot pressure acting on the hydraulic control valve HV1 becomes smaller than the right pilot pressure. Thus, the hydraulic control valve HV1 moves to the left.

Further, when the solenoid valve EV1 is positioned in an intermediate position between the second position and the first position, the solenoid valve EV1 is configured such that the opening area of each of the first oil passage and the second oil passage increases as the solenoid valve EV1 moves away from the neutral position. In addition, when the solenoid valve EV1 is positioned in an intermediate position between the second position and the third position, the solenoid valve EV1 is configured such that the opening area of the third oil passage and the fourth oil passage increases as the solenoid valve EV1 moves away from the neutral position.

Figure 4:
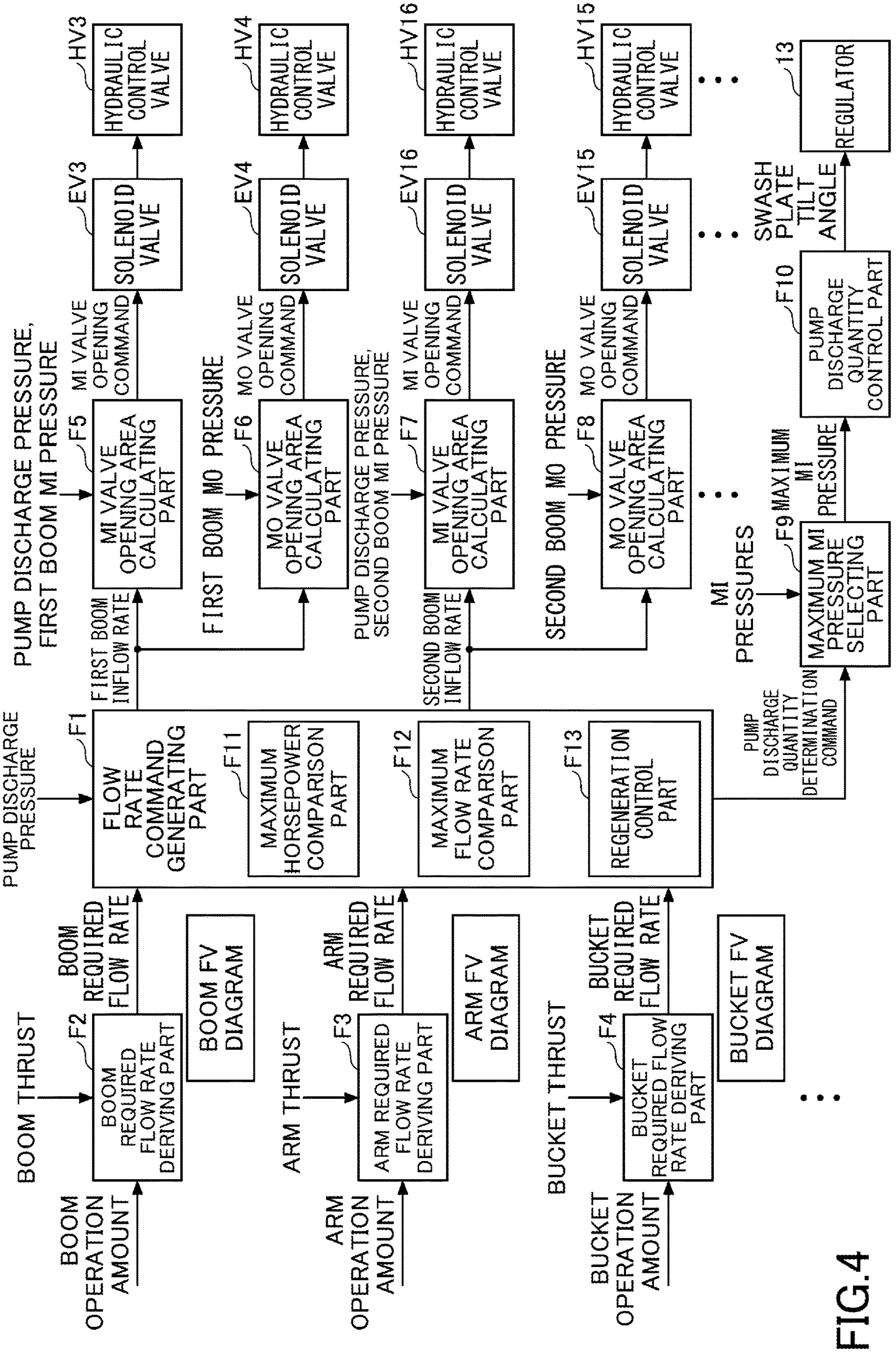
FIG. 4 is a diagram illustrating an example flow of control for the movement of the shovel.

Next, an example flow of control for the movement of the shovel 100 will be described with reference to FIG. 4. FIG. 4 is a diagram illustrating an example flow of control for the movement of the shovel 100. This flow of control is executed by the controller 30. The example illustrated in FIG. 4 depicts the flow of control when a combined operation including a boom raising operation, an arm closing operation, and a bucket closing operation is performed. In FIG. 4, the flow of control executed by the controller 30 is represented by a plurality of functional blocks. In the example illustrated in FIG. 4, functions represented by the functional blocks are implemented by software. However, the functions represented by the functional blocks may be implemented by hardware or by a combination of software and hardware. In FIG. 4, a meter-in valve is denoted as a "MI valve" and a meter-out valve is denoted as a "MO valve" for clarity.

A boom required flow rate deriving part F2 is configured to derive a boom required flow rate based on a boom operation amount and boom thrust. The value of the boom operation amount is an example of a movement command value, and is the value of the operation amount of the operation device 26 for the operation of the boom 4. In the example illustrated in FIG. 4, the boom operation amount is a value corresponding to the tilt angle of the right operation lever when the right operation lever is tilted in the front-rear direction.

The boom thrust is thrust that moves the boom 4. The boom thrust is represented by, for example, a value obtained by multiplying a differential pressure between the boom bottom pressure and the boom rod pressure by the pressure-receiving area. The differential pressure between the boom bottom pressure (meter-in pressure) and the boom rod pressure (meter-out pressure) is a value obtained by subtracting the meter-out pressure from the meter-in pressure, and is also referred to as a "boom effective pressure" that is one of "effective pressures". The pressure-receiving area is the pressure-receiving area of a piston of the boom cylinder 7. In the example illustrated in FIG. 4, the pressure-receiving area of the rod-side oil chamber is smaller than the pressure-receiving area of the bottom-side oil chamber by the cross-sectional area of the rod.

The boom required flow rate is a required flow rate of the boom cylinder 7. Specifically, the boom required flow rate is a target value of the amount of hydraulic oil flowing into the boom cylinder 7 per unit time.

A flow rate command generating part F1 is configured to calculate a target value of the flow rate of hydraulic oil supplied to each of the hydraulic actuators based on a required flow rate of each of the hydraulic actuators and a pump discharge pressure. In the example illustrated in FIG.

4, the flow rate command generating part F1 is configured to output a command value corresponding to the target value.

In the example illustrated in FIG. 4, the flow rate command generating part F1 outputs a first boom inflow rate, which is an example of a flow rate command, to an MI valve opening area calculating part F5 and a MO valve opening area calculating part F6. The first boom inflow rate is a target value relating to the flow rate of hydraulic oil supplied from the first hydraulic pump 14A to the boom cylinder 7 through a first meter-in valve (in this example, the hydraulic control valve HV3). The first meter-in valve is one of the two meter-in valves associated with the boom cylinder 7.

The MI valve opening area calculating part F5 is configured to control the first meter-in valve disposed between the first hydraulic pump 14A and the boom cylinder 7. For example, the MI valve opening area calculating part F5 is configured to calculate the opening area of the first meter-in valve. In the example illustrated in FIG. 4, the MI valve opening area calculating part F5 calculates the opening area of the hydraulic control valve HV3 that functions as the first meter-in valve during a boom raising movement.

Specifically, the MI valve opening area calculating part F5 calculates the opening area of the first meter-in valve (hydraulic control valve HV3) based on the first boom inflow rate, a first boom MI pressure, the discharge pressure of the first hydraulic pump 14A, and a predetermined equation.

The first boom MI pressure is a detection value of the pressure sensor S4B, and the discharge pressure of the first hydraulic pump 14A is a detection value of the pressure sensor S7A.

The predetermined equation is an orifice flow rate equation expressed by Equation 1 below, and the opening area A1 of the first meter-in valve (hydraulic control valve HV3) is expressed by Equation (2), where Q1 denotes the first boom inflow rate, P1 denotes the discharge pressure of the first hydraulic pump 14A, P2 denotes the first boom MI pressure, and A1 denotes the opening area of the first meter-in valve (hydraulic control valve HV3). Note that C is a flow rate coefficient and ρ is a fluid density.

$$Q = C \times A \times \sqrt{\frac{2 \times \Delta P}{\rho}} \quad (1)$$

$$A1 = \frac{Q1}{C \times \sqrt{\frac{2 \times (P1 - P2)}{\rho}}} \quad (2)$$

The MI valve opening area calculating part F5 outputs an MI valve opening command to the solenoid valve EV3 corresponding to the hydraulic control valve HV3 such that the calculated opening area of the first meter-in valve (hydraulic control valve HV3) is achieved. The MI valve opening command is typically a current command.

In this manner, the MI valve opening area calculating part F5 controls the opening area of the first meter-in valve such that hydraulic oil can flow into the bottom-side oil chamber of the boom cylinder 7 at a desired flow rate (first boom inflow rate Q1).

The MO valve opening area calculating part F6 is configured to control a first meter-out valve disposed between the boom cylinder 7 and the hydraulic oil tank T. The first meter-out valve is one of the two meter-out valves associated with the boom cylinder 7. For example, the MO valve opening area calculating part F6 is configured to calculate the opening area of the first meter-out valve. In the example illustrated in FIG. 4, the MO valve opening area calculating part F6 calculates the opening area of the hydraulic control valve HV4 that functions as the first meter-out valve during the boom raising movement.

Specifically, the MO valve opening area calculating part F6 calculates the opening area of the first meter-out valve (hydraulic control valve HV4) based on a first boom outflow rate, which is an example of an outflow rate, a first boom MO pressure, a hydraulic oil tank pressure, and a predetermined equation. The first boom outflow rate is a target value relating to the flow rate of hydraulic oil discharged from the boom cylinder 7 to the hydraulic oil tank T through the first meter-out valve. In the example illustrated in FIG. 4, the first boom outflow rate is calculated from the first boom inflow rate. Typically, in a hydraulic cylinder, an inflow rate and an outflow rate are different values, and in a hydraulic motor, an inflow rate and an outflow rate are the same value. This is because, in a single rod hydraulic cylinder, the cross-sectional area of a rod-side oil chamber is smaller than the cross-sectional area of a bottom-side oil chamber.

The first boom MO pressure is a detection value of the pressure sensor S4R, and the hydraulic oil tank pressure is a preset value (for example, atmospheric pressure). However, the hydraulic oil tank pressure may be a detection value of a pressure sensor.

The predetermined equation is, for example, the orifice flow rate equation expressed by the above Equation 1, and the opening area A2 of the first meter-out valve (hydraulic control valve HV4) is expressed by Equation (3), where Q2 denotes the first boom outflow rate, P3 denotes the first boom MO pressure, P4 denotes the hydraulic oil tank pressure, and A2 denotes the opening area of the first meter-out valve (hydraulic control valve HV4). Note that C is a flow rate coefficient and p is a fluid density.

$$A2 = \frac{Q2}{C \times \sqrt{\frac{2 \times (P3 - P4)}{\rho}}} \quad (3)$$

The MO valve opening area calculating part F6 outputs an MO valve opening command to the solenoid valve EV4 corresponding to the hydraulic control valve HV4 such that the calculated opening area of the first meter-out valve (hydraulic control valve HV4) is achieved. The MO valve opening command is typically a current command.

In this manner, the MO valve opening area calculating part F6 controls the opening area of the first meter-out valve such that hydraulic oil can flow out of the rod-side oil chamber of the boom cylinder 7 at a desired flow rate (first boom outflow rate Q2).

Further, the flow rate command generating part F1 outputs a second boom inflow rate, which is an example of a flow rate command, to an MI valve opening area calculating part F7 and an MO valve opening area calculating part F8. The second boom inflow rate is a target value relating to the flow rate of hydraulic oil supplied from the second hydraulic pump 14B to the boom cylinder 7 through a second meter-in valve (in this example, the hydraulic control valve HV16). The second meter-in valve is the other meter-in valve of the two meter-in valves associated with the boom cylinder 7. Typically, the second boom inflow rate is set such that the sum of the first boom inflow rate and the second boom inflow rate becomes the boom required flow rate.

The MI valve opening area calculating part F7 is configured to control the second meter-in valve disposed between the second hydraulic pump 14B and the boom cylinder 7. For example, the MI valve opening area calculating part F7 is configured to calculate the opening area of the second meter-in valve. In the example illustrated in FIG. 4, the MI valve opening area calculating part F7 calculates the opening area of the hydraulic control valve HV16 that functions as the second meter-in valve during the boom raising movement.

Specifically, the MI valve opening area calculating part F7 calculates the opening area of the second meter-in valve (hydraulic control valve HV16) based on the second boom inflow rate, a second boom MI pressure, the discharge pressure of the second hydraulic pump 14B, and a predetermined equation.

The second boom MI pressure is a detection value of the pressure sensor S4B, and the discharge pressure of the second hydraulic pump 14B is a detection value of the pressure sensor S7B.

The predetermined equation is, for example, the orifice flow rate equation expressed by the above Equation 1, and the opening area A3 of the second meter-in valve (hydraulic control valve HV16) is expressed by Equation (4), where Q3 denotes the second boom inflow rate, P5 denotes the discharge pressure of the second hydraulic pump 14B, P6 denotes the second boom MI pressure, and A3 denotes the opening area of the second meter-in valve (hydraulic control valve HV16). Note that C is a flow rate coefficient and p is a fluid density.

$$A3 = \frac{Q3}{C \times \sqrt{\frac{2 \times (P5 - P6)}{\rho}}} \tag{4}$$

The MI valve opening area calculating part F7 outputs an MI valve opening command to the solenoid valve EV16 corresponding to the hydraulic control valve HV16 such that the calculated opening area of the second meter-in valve (hydraulic control valve HV16) is achieved. The MI valve opening command is typically a current command.

In this manner, the MI valve opening area calculating part F7 controls the opening area of the second meter-in valve such that hydraulic oil can flow into the bottom-side oil chamber of the boom cylinder 7 at a desired flow rate (second boom inflow rate Q3).

The MO valve opening area calculating part F8 is configured to control a second meter-out valve disposed between the boom cylinder 7 and the hydraulic oil tank T. The second meter-out valve is the other meter-out valve of the two meter-out valves associated with the boom cylinder 7. For example, the MO valve opening area calculating part F8 is configured to calculate the opening area of the second meter-out valve. In the example illustrated in FIG. 4, the MO valve opening area calculating part F8 calculates the opening area of the hydraulic control valve HV15 that functions as the second meter-out valve during the boom raising movement.

Specifically, the MO valve opening area calculating part F8 calculates the opening area of the second meter-out valve (hydraulic control valve HV15) based on a second boom outflow rate, which is an example of an outflow rate, a second boom MO pressure, a hydraulic oil tank pressure, and a predetermined equation. The second boom outflow rate is a target value relating to the flow rate of hydraulic oil discharged from the boom cylinder 7 to the hydraulic oil tank T through the second meter-out valve. In the example illustrated in FIG. 4, the second boom outflow rate is calculated from the second boom inflow rate.

The second boom MO pressure is a detection value of the pressure sensor S4R, and the hydraulic oil tank pressure is a preset value (for example, atmospheric pressure). However, the hydraulic oil tank pressure may be a detection value of a pressure sensor.

The predetermined equation is, for example, the orifice flow rate equation expressed by the above Equation 1, and the opening area A4 of the second meter-out valve (hydraulic control valve HV15) is expressed by Equation (5), where Q4 denotes the second boom outflow rate, P7 denotes the second boom MO pressure, P8 denotes the hydraulic oil tank pressure, and A4 denotes the opening area of the second meter-out valve (hydraulic control valve HV15). Note that C is a flow rate coefficient and p is a fluid density.

$$A4 = \frac{Q4}{C \times \sqrt{\frac{2 \times (P7 - P8)}{\rho}}} \tag{5}$$

The MO valve opening area calculating part F8 outputs an MO valve opening command to the solenoid valve EV15 corresponding to the hydraulic control valve HV15 such that the calculated opening area of the second meter-out valve (hydraulic control valve HV15) is achieved. The MO valve opening command is typically a current command.

In this manner, the MO valve opening area calculating part F8 controls the opening area of the second meter-out valve such that hydraulic oil can flow out from the rod-side oil chamber of the boom cylinder 7 at a desired flow rate (second boom outflow rate Q4).

Although not illustrated in FIG. 4, the flow rate command generating part F1 is configured to output flow rate commands to two MI opening area calculating parts that control the opening areas of the two meter-in valves associated with the arm cylinder 8, two MO opening area calculating parts that control the opening areas of the two meter-out valves associated with the arm cylinder 8, an MI opening area calculating part controls the meter-in valve associated with the bucket cylinder 9, and two MO opening area calculating parts that control the opening areas of the two meter-out valves associated with the bucket cylinder 9.

Further, the flow rate command generating part F1 is configured to output a command for determining the pump discharge quantity of the hydraulic pump 14. Specifically, the flow rate command generating part F1 outputs a pump discharge quantity determination command to a maximum MI pressure selecting part F9.

The maximum MI pressure selecting part F9 is configured to select, as a maximum MI pressure, a maximum value of one or more meter-in pressures. The meter-in pressures are the pressures of hydraulic oil downstream of meter-in valves. Specifically, the meter-in pressures are the pressures of hydraulic oil in conduits connecting meter-in valves and hydraulic actuators. In the example illustrated in FIG. 4 in which the boom raising movement is performed, the meter-in pressures include the pressure of hydraulic oil in a conduit connecting the hydraulic control valve HV3, which functions as the meter-in valve, and the bottom-side oil chamber of the boom cylinder 7, that is, the boom bottom pressure detected by the pressure sensor S4B.

When the combined operation including the boom raising operation, the arm closing operation, and the bucket closing operation is performed, the maximum MI pressure selecting part F9 selects, as a maximum MI pressure, a maximum value of the boom bottom pressure, the arm bottom pressure, and the bucket bottom pressure.

In the example illustrated in FIG. 4, the maximum MI pressure selecting part F9 selects, as a first maximum MI pressure, a maximum value of one or more meter-in pressures relating to the first hydraulic pump 14A. Further, the maximum MI pressure selecting part F9 selects, as a second maximum MI pressure, a maximum value of one or more meter-in pressures relating to the second hydraulic pump 14B. The one or more meter-in pressures relating to the first hydraulic pump 14A are meter-in pressures relating to one or more of the hydraulic control valves HV1 to HV10. The one or more meter-in pressures relating to the second hydraulic pump 14B are meter-in pressures relating to one or more of the hydraulic control valves HV11 to HV20.

Then, the maximum MI pressure selecting part F9 outputs the selected maximum MI pressures to a pump discharge quantity control part F10.

The pump discharge quantity control part F10 is configured to control the pump discharge quantity of the hydraulic pump 14. In the example illustrated in FIG. 4, the pump discharge quantity control part F10 calculates a command value to be output to the regulator 13 of the hydraulic pump 14, which is the swash plate variable displacement hydraulic pump, based on the maximum MI pressures output from the maximum MI pressure selecting part F9. In this case, the command value is, for example, a swash plate tilt angle.

Specifically, the pump discharge quantity control part F10 calculates a swash plate tilt angle to be output to the first regulator 13A of the first hydraulic pump 14A, based on the first maximum MI pressure output from the maximum MI pressure selecting part F9. Further, the pump discharge quantity control part F10 calculates a swash plate tilt angle to be output to the second regulator 13B of the second hydraulic pump 14B, based on the second maximum MI pressure output from the maximum MI pressure selecting part F9.

The regulator 13 changes the discharge quantity of the hydraulic pump 14 by changing the swash plate tilt angle of the hydraulic pump 14 in accordance with the command value from the pump discharge quantity control part F10. Specifically, the first regulator 13A changes the discharge quantity of the first hydraulic pump 14A, and the second regulator 13B changes the discharge quantity of the second hydraulic pump 14B.

In this manner, the controller 30 can appropriately control the flow rate of hydraulic oil flowing into the hydraulic actuators, the flow rate of hydraulic oil flowing out of the hydraulic actuators, and the discharge quantity of the hydraulic pump 14.

Figure 5A:
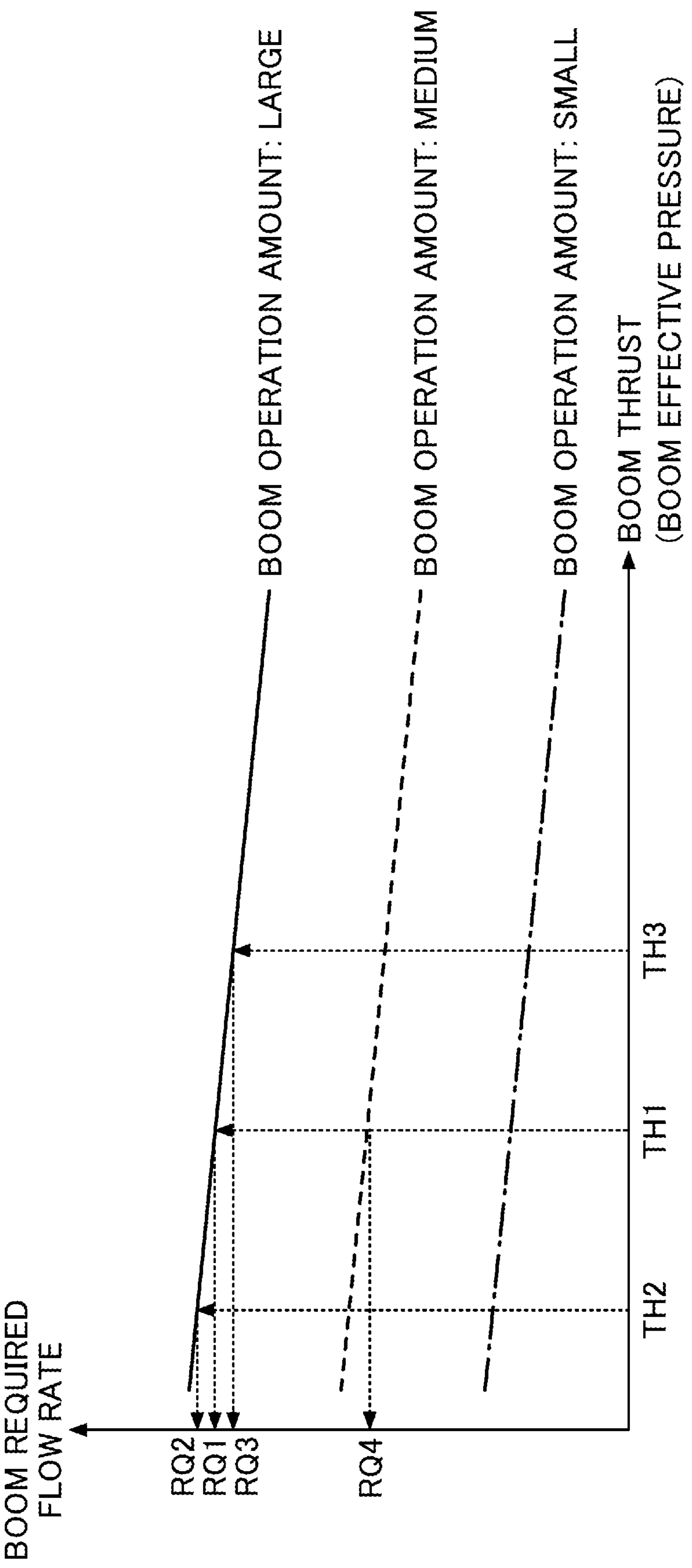
FIG. 5A is a conceptual FV diagram.
Figure 5B:
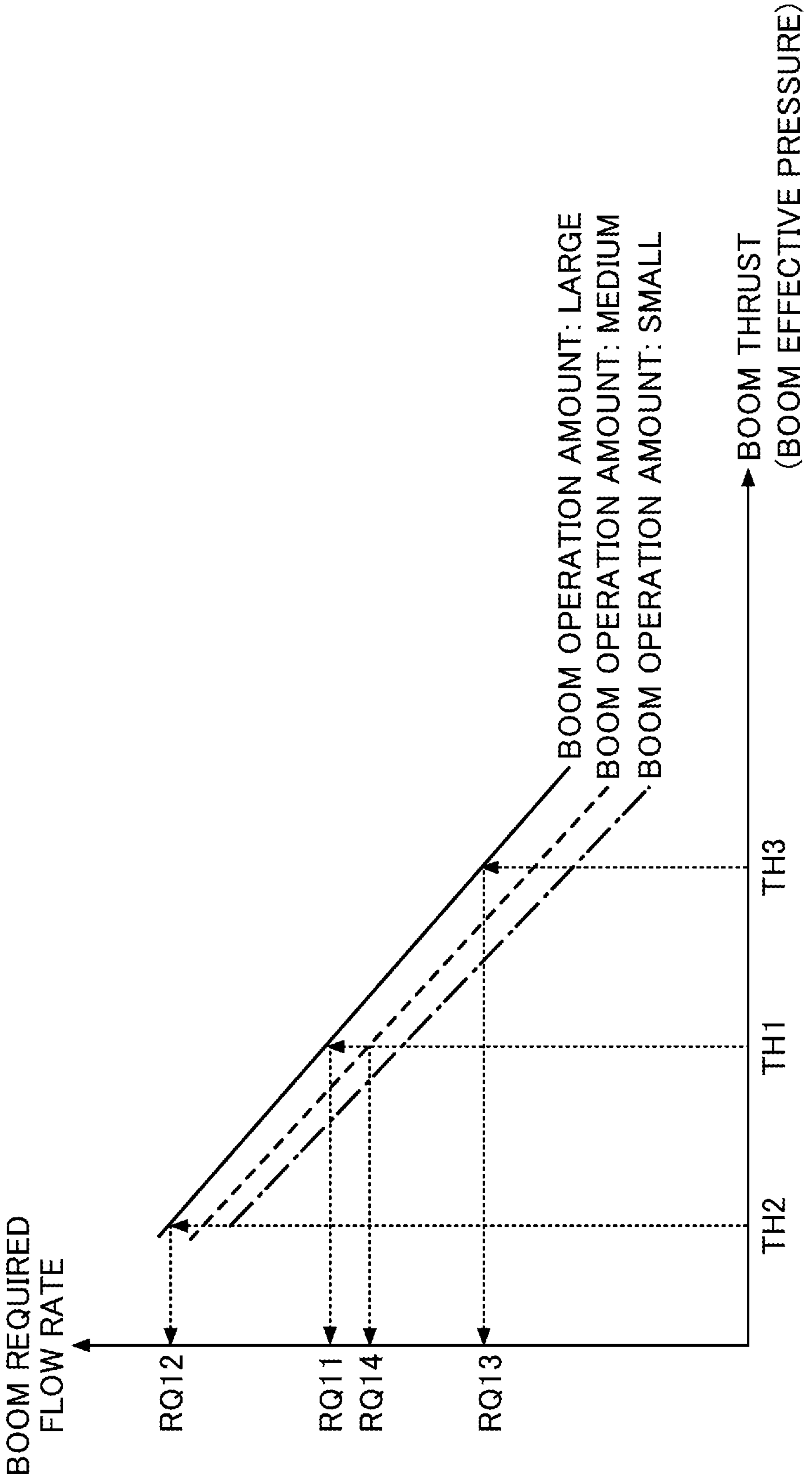
FIG. 5B is a conceptual FV diagram.

Next, an example of a process of deriving a boom required flow rate by the boom required flow rate deriving part F2 will be described with reference to to FIG. 5A and FIG. 5B. FIG. 5A and FIG. 5B are conceptual boom FV diagrams that are used when the boom required flow rate deriving part F2 derives a boom required flow rate. In each of the FV diagrams, "F" refers to thrust and "V" refers to a required flow rate. That is, each of the FV diagrams is a database (reference table) that stores a correspondence relationship among an operation amount (a boom operation amount), thrust F (boom thrust), and a required flow rate V (boom required flow rate) in a referable manner. The thrust F (boom thrust) may be an effective pressure (boom effective pressure). Further, the required flow rate V (boom required flow rate) may be a required speed (boom required speed). The boom required speed is a required speed of the boom cylinder 7. Specifically, the boom required speed is a target value of the amount of extension/retraction of the boom cylinder 7 per unit time.

Specifically, FIG. 5A is an FV diagram in which a change in the required flow rate V (boom required flow rate) with respect to a change in the thrust F (boom thrust) is relatively small. FIG. 5B is an FV diagram in which a change in the required flow rate V (boom required flow rate) with respect to a change in the thrust F (boom thrust) is relatively large. Each of the FV diagrams is configured such that the correspondence relationship among the operation amount (boom operation amount), the thrust F (boom thrust), and the required flow rate V (boom required flow rate) can be set as desired. The following description relates to the process of deriving a boom required flow rate by the boom required flow rate deriving part F2, but is similarly applied to a process of deriving an arm required flow rate by an arm required flow rate deriving part F3, a process of deriving a bucket required flow rate by a bucket required flow rate deriving part F4, and the like.

The boom required flow rate deriving part F2 receives boom thrust and a boom operation amount as inputs. The boom required flow rate deriving part F2 is configured to derive a boom required flow rate corresponding to the boom thrust and the boom operation amount received as the inputs by using any of the boom FV diagrams, and output the derived boom required flow rate to the flow rate command generating part F1.

For example, in the example illustrated in FIG. 5A, when a value TH1 is input as the boom thrust and "large" is input as the boom operation amount, the boom required flow rate deriving part F2 derives a value RQ1 as the boom required flow rate.

Further, in the example illustrated in FIG. 5B, when a value TH1 is input as the boom thrust and "large" is input as the boom operation amount, the boom required flow rate deriving part F2 derives a value RQ11 as the boom required flow rate.

In FIG. 5A and FIG. 5B, the boom operation amount is classified into three levels, "large", "medium", and "small" for the sake of clarity. However, in practice, the boom FV diagrams are configured such that the boom operation amount can be classified into more levels. For example, when the boom operation amount is represented by a lever operation angle, the boom FV diagrams may be configured such that the lever operation angle may be expressed in increments of 0.1 degrees.

In the boom FV diagram illustrated in FIG. 5A, in a case where the boom operation amount is maintained to be "large", the boom required flow rate increases from the value RQ1 to a value RQ2 upon a decrease in the boom thrust from the value TH1 to a value TH2, and the boom required flow rate decreases from the value RQ1 to a value RQ3 upon an increase in the boom thrust from the value TH1 to a value TH3.

Similarly, in the boom FV diagram illustrated in FIG. 5B, in a case where the boom operation amount is maintained to be "large", the boom required flow rate increases from the value RQ11 to a value RQ12 upon a decrease in the boom thrust from the value TH1 to a value TH2, and the boom required flow rate decreases from the value RQ11 to a value RQ13 upon an increase in the boom thrust from the value TH1 to a value TH3.

An increment (RQ2-RQ1) in the boom required flow rate in the boom FV diagram illustrated in FIG. 5A is smaller than an increment (RQ12-RQ11) in the boom required flow rate in the boom FV diagram illustrated in FIG. 5B when the boom thrust decreases from the value TH1 to the value TH2. Further, a decrement (RQ1–RQ3) in the boom required flow rate in the boom FV diagram illustrated in FIG. 5A is smaller than a decrement (RQ11–RQ13) in the boom required flow rate in the boom FV diagram illustrated in FIG. 5B when the boom thrust increases from the value TH1 to the value TH3. This means that a change in the movement speed of the boom 4 with respect to a change in the boom thrust is smaller when the boom FV diagram illustrated in FIG. 5A is used than when the boom FV diagram illustrated in FIG. 5B is used.

Further, an increment (RQ1-RQ4) in the boom required flow rate in the boom FV diagram illustrated in FIG. 5A is larger than an increment (RQ11-RQ14) in the boom required flow rate in the boom FV diagram illustrated in FIG. 5B when the boom operation amount changes from “medium” to “large” with the boom thrust being set to the value TH1. This means that a change in the movement speed of the boom 4 with respect to a change in the boom operation amount is larger when the boom FV diagram illustrated in FIG. 5A is used than when the boom FV diagram illustrated in FIG. 5B is used.

For example, the boom required flow rate deriving part F2 may be configured to select and use one boom FV diagram suitable for the work content from among a plurality of boom FV diagrams set in advance. In this case, the work content is, for example, excavation work, loading work, horizontal pulling work, slope finishing work, or the like. The work content is determined based on, for example, at least one of the operation content of the operation device 26, the outputs of the pressure sensors S1 to S7, and the like.

Alternatively, the boom required flow rate deriving part F2 may be configured to select and use one boom FV diagram suitable for the movement content of the shovel 100 from among a plurality of boom FV diagrams set in advance. In this case, the movement content of the shovel 100 is, for example, a boom raising movement, a boom lowering movement, a swing movement, an arm closing movement, an arm opening movement, or the like. The movement content is determined based on, for example, at least one of the operation content of the operation device 26, the outputs of the pressure sensors S1 to S7, and the like.

Note that the FV diagram illustrated in FIG. 5A is suitable for use when a boom raising movement is performed after excavation, for example. This is because it is possible to suppress a large change in the boom raising speed due to a difference in the weight of soil or the like loaded into the bucket 6 even if the boom operation amount is the same.

Further, the FV diagram illustrated in FIG. 5B is suitable for use when an arm closing movement is performed for excavation, for example. This is because the operator can easily recognize the excavation resistance due to soil or the like when the arm closing speed decreases along with an increase in arm thrust even if an arm operation amount is the same. For example, the operator can recognize that the excavation resistance increases as the arm closing speed decreases. Further, vibration of the body of the shovel 100 is easily reduced when the arm closing speed decreases along with an increase in the arm thrust even if the arm operation amount is the same.

Further, in the examples described above, each of the FV diagrams is implemented by using the database (reference table), but may be implemented by using a mathematical expression.

Figure 6A:
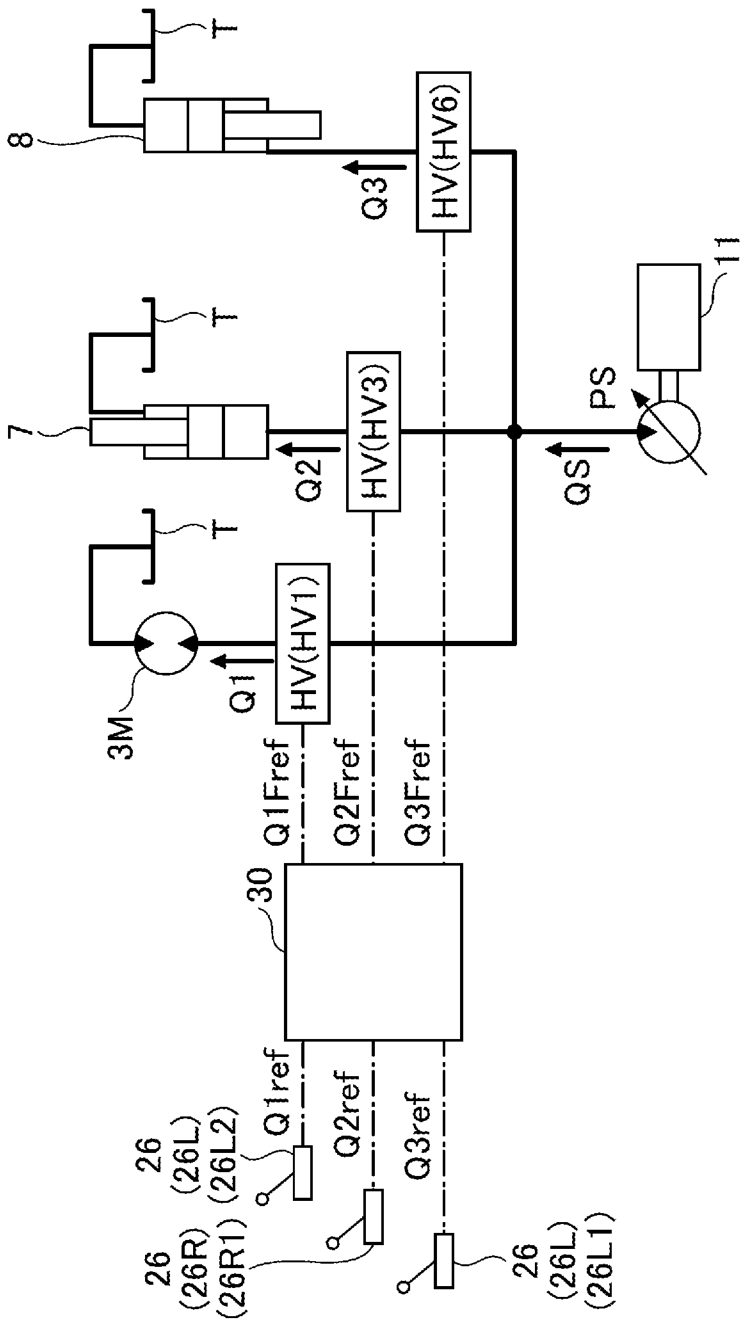
FIG. 6A is a schematic diagram illustrating a flow of a process executed by a controller.
Figure 6B:
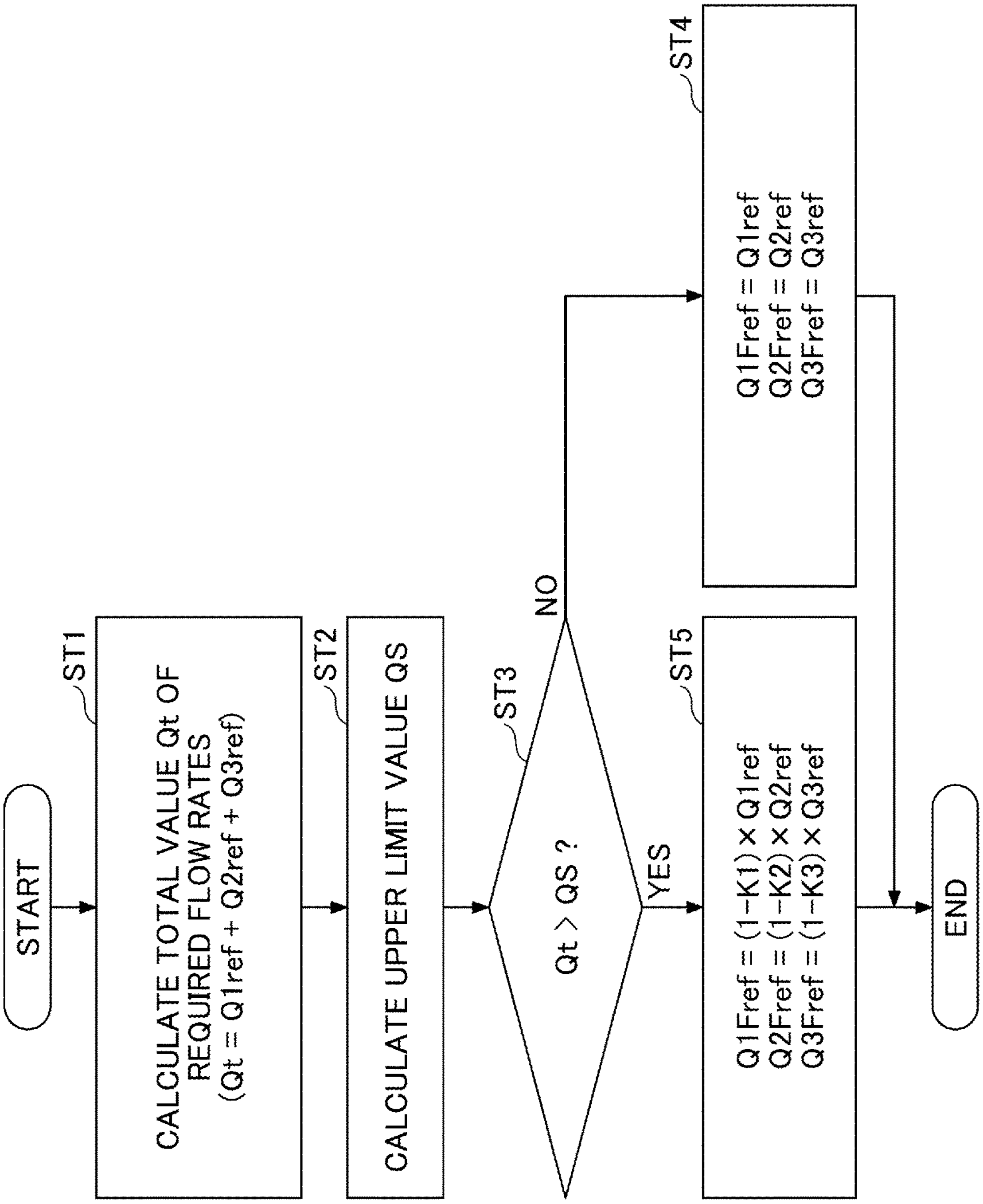
FIG. 6B is a flowchart illustrating the flow of the process executed by the controller.

Next, the flow rate command generating part F1 will be described in detail with reference to FIG. 6A and FIG. 6B. FIG. 6A and FIG. 6B are diagrams illustrating a flow of a process executed by the flow rate command generating part F1. Specifically, FIG. 6A is a schematic diagram illustrating the flow of the process executed by the flow rate command generating part F1. FIG. 6B is a flowchart illustrating the flow of the process executed by the flow rate command generating part F1.

In the example illustrated in FIG. 6A and FIG. 6B, the operator operates the operation device 26 (a left operation lever 26L and a right operation lever 26R) installed in the cabin 10 to simultaneously move the swing hydraulic motor 3M, the boom cylinder 7, and the arm cylinder 8. Specifically, the operator simultaneously performs a counterclockwise swing operation, a boom raising operation, and an arm opening operation.

The left operation lever 26L is configured to function as an arm operation lever 26L1 when tilted in the front-rear direction and is configured to function as a swing operation lever 26L2 when tilted in the left-right direction. Further, the right operation lever 26R is configured to function as a boom operation lever 26R1 when tilted in the front-rear direction and is configured to function as a bucket operation lever 26R2 when tilted in the left-right direction.

First, the flow rate command generating part F1 calculates a total value Qt of required flow rates (step ST1). In the example illustrated in FIG. 6A and FIG. 6B, the total value Qt of the required flow rates is a total value of a pre-adjustment swing required flow rate Q1ref, a pre-adjustment boom required flow rate Q2ref, and a pre-adjustment arm required flow rate Q3ref. The pre-adjustment swing required flow rate Q1ref is a value calculated from a swing operation amount. Similarly, the pre-adjustment boom required flow rate Q2ref is a value calculated from a boom operation amount, and the pre-adjustment arm required flow rate Q3ref is a value calculated from an arm operation amount.

Subsequently, the flow rate command generating part F1 calculates an upper limit value QS of a pump discharge quantity (step ST2). In the present embodiment, the flow rate command generating part F1 calculates the upper limit value QS of the pump discharge quantity based on a pump discharge pressure PS, such that the absorbed power (absorbed horsepower) of the hydraulic pump 14 derived by multiplying the pump discharge pressure by the pump discharge quantity is less than or equal to the maximum power (maximum horsepower) of the engine 11. Note that the flow rate command generating part F1 may use, as the upper limit value QS, an upper limit value of a pump discharge quantity that is mechanically determined by the structure of the hydraulic pump 14.

Subsequently, the flow rate command generating part F1 compares the total value Qt of the required flow rates with the upper limit value QS of the pump discharge quantity (step ST3). If the upper limit value QS of the pump discharge quantity is calculated based on the maximum output of the engine 11, this comparison step is performed by a maximum horsepower comparison part F11 illustrated in FIG. 4. If the upper limit value QS of the pump discharge quantity is determined by mechanical restrictions of the hydraulic pump 14, this comparison step is performed by a maximum flow rate comparison part F12 illustrated in FIG. 4.

If the total value Qt of the required flow rates is less than or equal to the upper limit value QS of the pump discharge quantity (NO in step ST3), the flow rate command generating part F1 sets the pre-adjustment swing required flow rate Q1ref as a swing required flow rate Q1Fref, sets the pre-adjustment boom required flow rate Q2ref as a boom required flow rate Q2Fref, and sets the pre-adjustment arm required flow rate Q3ref as an arm required flow rate Q3Fref (step ST4).

The swing required flow rate Q1Fref is a current command to be output to the solenoid valve EV1 corresponding to the hydraulic control valve HV1. Specifically, the swing required flow rate Q1Fref is a value set such that the flow rate of hydraulic oil flowing into the left port of the swing hydraulic motor 3M through the hydraulic control valve HV1 functioning as the meter-in valve becomes a value Q1.

The boom required flow rate Q2Fref is a current command to be output to the solenoid valve EV3 corresponding to the hydraulic control valve HV3. Specifically, the boom required flow rate Q2Fref is a value set such that the flow rate of hydraulic oil flowing into the bottom-side oil chamber of the boom cylinder 7 through the hydraulic control valve HV3 functioning as the meter-in valve becomes a value Q2.

The arm required flow rate Q3Fref is a current command to be output to the solenoid valve EV6 corresponding to the hydraulic control valve HV6. Specifically, the arm required flow rate Q3Fref is a value set such that the flow rate of hydraulic oil flowing into the rod-side oil chamber of the arm cylinder 8 through the hydraulic control valve HV6 functioning as the meter-in valve becomes a value Q3.

In this case, the sum of the value Q1 of the flow rate of the hydraulic oil flowing into the left port of the swing hydraulic motor 3M, the value Q2 of the flow rate of the hydraulic oil flowing into the bottom-side oil chamber of the boom cylinder 7, and the value Q3 of the flow rate of the hydraulic oil flowing into the rod-side oil chamber of the arm cylinder 8 is less than or equal to the upper limit value QS of the pump discharge quantity.

Conversely, if the total value Qt of the required flow rates exceeds the upper limit value QS of the pump discharge quantity (YES in step ST3), the flow rate command generating part F1 sets a value obtained by multiplying the pre-adjustment swing required flow rate Q1ref by a value (1−K1) as a swing required flow rate Q1Fref, sets a value obtained by multiplying the pre-adjustment boom required flow rate Q2ref by a value (1−K2) as a boom required flow rate Q2Fref, and sets a value obtained by multiplying the pre-adjustment arm required flow rate Q3ref by a value (1−K3) as an arm required flow rate Q3Fref (step ST5). The value K1, the value K2, and the value K3 are values set such that Equation (6) below is satisfied.

$$QS=(1-K1)\times Q1\mathrm{ref}+(1-K2)\times Q2\mathrm{ref}+(1-K3)\times Q3\mathrm{ref} \quad (6)$$

For example, each of the value K1, the value K2, and the value K3 may be a value K (=(Qt−QS)/Qt) of the ratio of a shortfall (Qt−QS) to the total value Qt of the required flow rates. The shortfall is a value obtained by subtracting the upper limit value QS of the pump discharge quantity from the total value Qt of the required flow rates.

In this case, if the value K of the ratio of the shortfall to the total value Qt of the required flow rates is 0.1, the swing required flow rate Q1Fref is a value obtained by multiplying the pre-adjustment swing required flow rate Q1ref by 0.9. Similarly, the boom required flow rate Q2Fref is a value obtained by multiplying the pre-adjustment boom required flow rate Q2ref by 0.9, and the arm required flow rate Q3Fref is a value obtained by multiplying the pre-adjustment arm required flow rate Q3ref by 0.9.

One effect of the above configuration is that the counterclockwise swing speed, the boom raising speed, and the arm opening speed can be changed (reduced) at the same ratio even when the total value Qt of the required flow rates exceeds the upper limit value QS of the pump discharge quantity. That is, one effect of the above configuration is that, for example, any one of the counterclockwise swing speed, the boom raising speed, and the arm opening speed can be prevented from being largely changed (reduced) as compared with the other two speeds.

Figure 7:
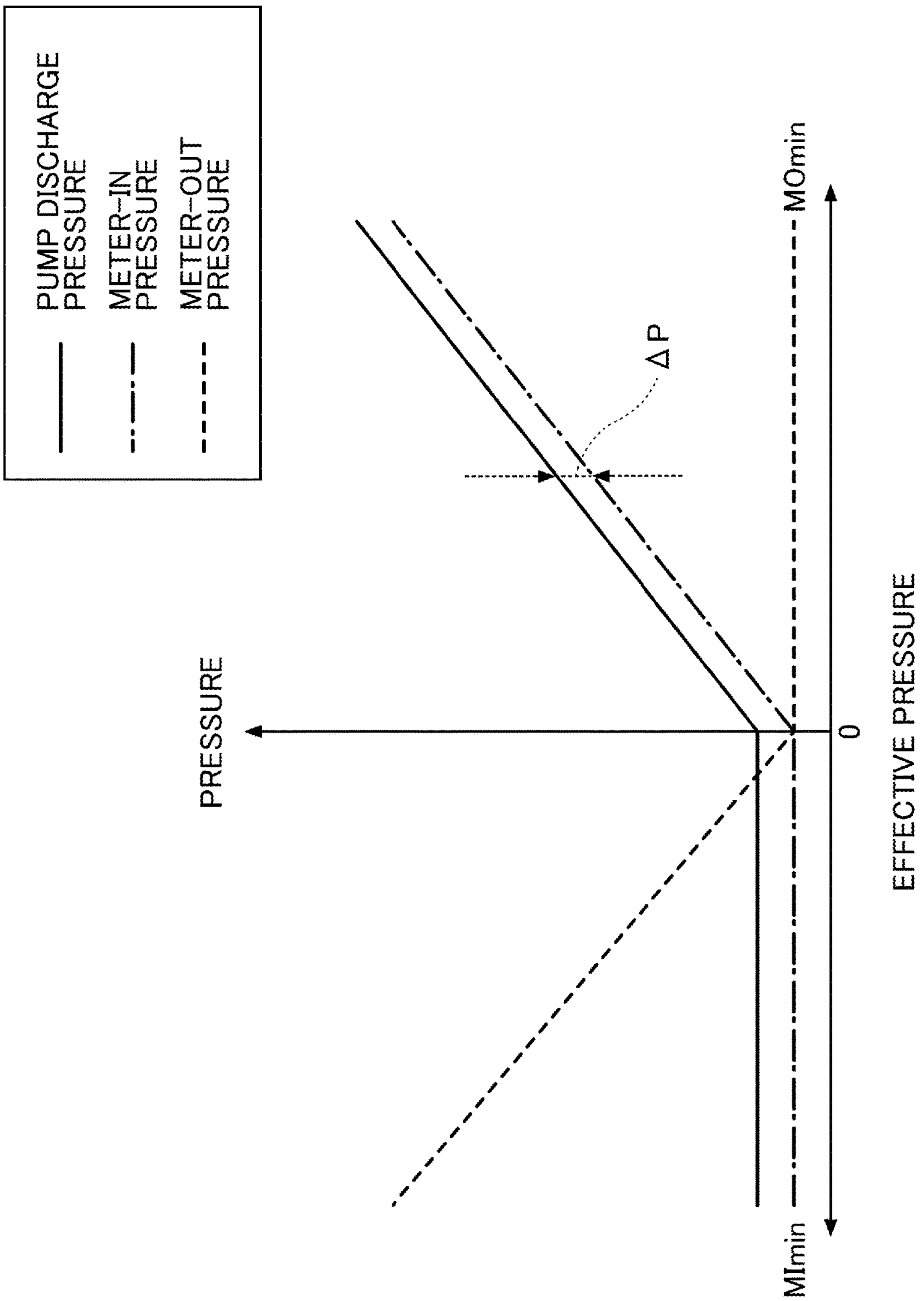
FIG. 7 is a graph illustrating the relationship between an effective pressure versus a meter-in pressure, a meter-out pressure, and a pump discharge pressure.

Next, an MO valve opening area calculating part will be described in detail with reference to FIG. 7. FIG. 7 is a graph illustrating the relationship between an effective pressure versus a meter-in pressure, a meter-out pressure, and a pump discharge pressure. Specifically, the horizontal axis of FIG. 7 corresponds to an effective pressure such as the boom effective pressure, an arm effective pressure, a bucket effective pressure, or a swing effective pressure, and the vertical axis of FIG. 7 corresponds to the pressure of hydraulic oil such as a meter-in pressure, a meter-out pressure, or a pump discharge pressure. Note that the following description relates to the MO valve opening area calculating part that controls the hydraulic control valve HV2 that functions as the meter-out valve associated with the swing hydraulic motor 3M, but is similarly applied to other MO valve opening area calculating parts that control other meter-out valves.

A state in which the effective pressure is a positive value (is in a right region) includes, for example, a state in which the swing effective pressure is a positive value. The state in which the swing effective pressure is the positive value includes a state in which the pressure (meter-in pressure) of hydraulic oil in the left port (inflow port) of the swing hydraulic motor 3M is higher than the pressure (meter-out pressure) of hydraulic oil in the right port (outflow port) of the swing hydraulic motor 3M during counterclockwise swing acceleration.

A state in which the effective pressure is a negative value (is in a left region) includes, for example, a state in which the swing effective pressure is a negative value. The state in which the swing effective pressure is the negative value includes a state in which the pressure (meter-out pressure) of hydraulic oil in the right port of the swing hydraulic motor 3M is higher than the pressure (meter-in pressure) of hydraulic oil in the left port of the swing hydraulic motor 3M during counterclockwise swing deceleration.

The MO valve opening area calculating part is configured to cause the hydraulic control valve HV2 to function as a relief valve when the effective pressure is a positive value, and cause the hydraulic control valve HV2 to function as a counterbalance valve when the effective pressure is a negative value.

Specifically, the MO valve opening area calculating part controls the opening area of the meter-out valve (hydraulic control valve HV2) such that each of the pressure (meter-in pressure) of hydraulic oil in the left port and the pressure (meter-out pressure) of hydraulic oil in the right port of the swing hydraulic motor 3M becomes the minimum pressure required.

More specifically, when the effective pressure is a positive value, that is, when the meter-in pressure is higher than the meter-out pressure, the MO valve opening area calculating part controls the opening area of the meter-out valve (hydraulic control valve HV2) such that the meter-out pressure becomes as low as possible within a range in which the meter-out pressure does not become negative. In the example illustrated in FIG. 7, the MO valve opening area calculating part controls the opening area of the meter-out valve (hydraulic control valve HV2) serving as the relief valve, such that the meter-out pressure becomes a predetermined value MOmin.

Further, when the effective pressure is a negative value, that is, when the meter-out pressure is higher than the meter-in pressure, the MO valve opening area calculating part controls the opening area of the meter-out valve (hydraulic control valve HV2) such that the meter-in pressure becomes as low as possible within a range in which the meter-in pressure does not become negative. In the example illustrated in FIG. 7, the MO valve opening area calculating part controls the opening area of the meter-out valve (hydraulic control valve HV2) serving as the counterbalance valve, such that the meter-in pressure becomes a predetermined value MImin.

In this manner, the MO valve opening area calculating part controls the opening area of the meter-out valve (hydraulic control valve HV2) by switching the control method in accordance with the direction of the load acting on the swing hydraulic motor 3M, that is, in accordance with the magnitude relationship between the meter-in pressure and the meter-out pressure.

With the above configuration, regardless of the direction of the load, the MO valve opening area calculating part can maintain the meter-in pressure and the meter-out pressure at the minimum levels while preventing the meter-in pressure and the meter-out pressure from becoming negative.

Further, the pump discharge quantity control part F10 controls the pump discharge pressure of the hydraulic pump 14, such that the pump discharge pressure of the hydraulic pump 14 is maintained at a pressure higher than the meter-in pressure by a predetermined pressure AP regardless of whether the effective pressure is a positive value or a negative value. The predetermined pressure ΔP is determined based on, for example, a minimum differential pressure required for the meter-in valve to allow a required flow rate to pass therethrough. The differential pressure means a difference between the pressure of hydraulic oil upstream of the meter-in valve and the pressure of hydraulic oil downstream of the meter-in valve. The pump discharge quantity control part F10 may control the pump discharge quantity in the same manner as load sensing control.

With the above configuration, the differential pressure between the pump discharge pressure and the meter-in pressure is minimized while the meter-in pressure is maintained at the minimum level by the meter-out valve. Thus, the pump discharge pressure can be reduced while ensuring the controllability of the hydraulic actuator. Therefore, with the above configuration, energy consumption of a drive source such as the engine 11 that drives the hydraulic pump 14 can be reduced while ensuring the controllability of the hydraulic actuator. In the example illustrated in FIG. 7, the swing hydraulic motor 3M is the swash plate variable displacement hydraulic pump; however, may be another type of hydraulic pump that can control the discharge pressure, such as a hydraulic pump that controls the discharge pressure by using a servo motor to control the rotation speed.

Figure 8:
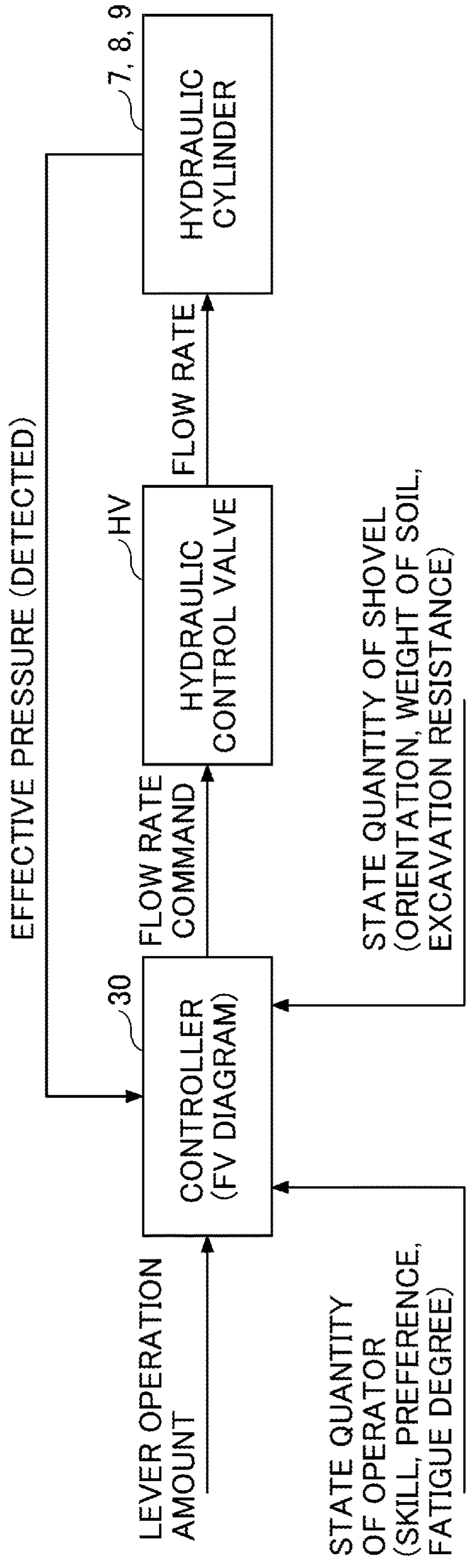
FIG. 8 is a diagram illustrating another example flow of control for the movement of the shovel.

Next, another example flow of control for the movement of the shovel 100 will be described with reference to FIG. 8. FIG. 8 is a diagram illustrating another example flow of control for the movement of the shovel 100. This flow of control is executed by the controller 30.

The example illustrated in FIG. 8 is different from the example illustrated in FIG. 4 in that a FV diagram is dynamically changed. Specifically, in the example illustrated in FIG. 8, the controller 30 is configured to dynamically change the details of the FV diagram in accordance with changes in at least one of the state quantity of the operator and the state quantity of the shovel.

The state quantity of the operator is, for example, a skill of the operator, a preference of the operator, a fatigue degree of the operator, or the like, and is typically indicated in multiple levels. The state quantity of the shovel is, for example, the orientation of the shovel, the weight of soil loaded into the bucket 6, the excavation resistance, or the like.

The controller 30 may be configured to change the details of the FV diagram in accordance with the specification of the shovel, the purpose of use of the shovel, a change in a characteristic of an excavation target, or the like. The characteristic of the excavation target is, for example, the viscosity, hardness, density, or the like of soil.

Figure 9:
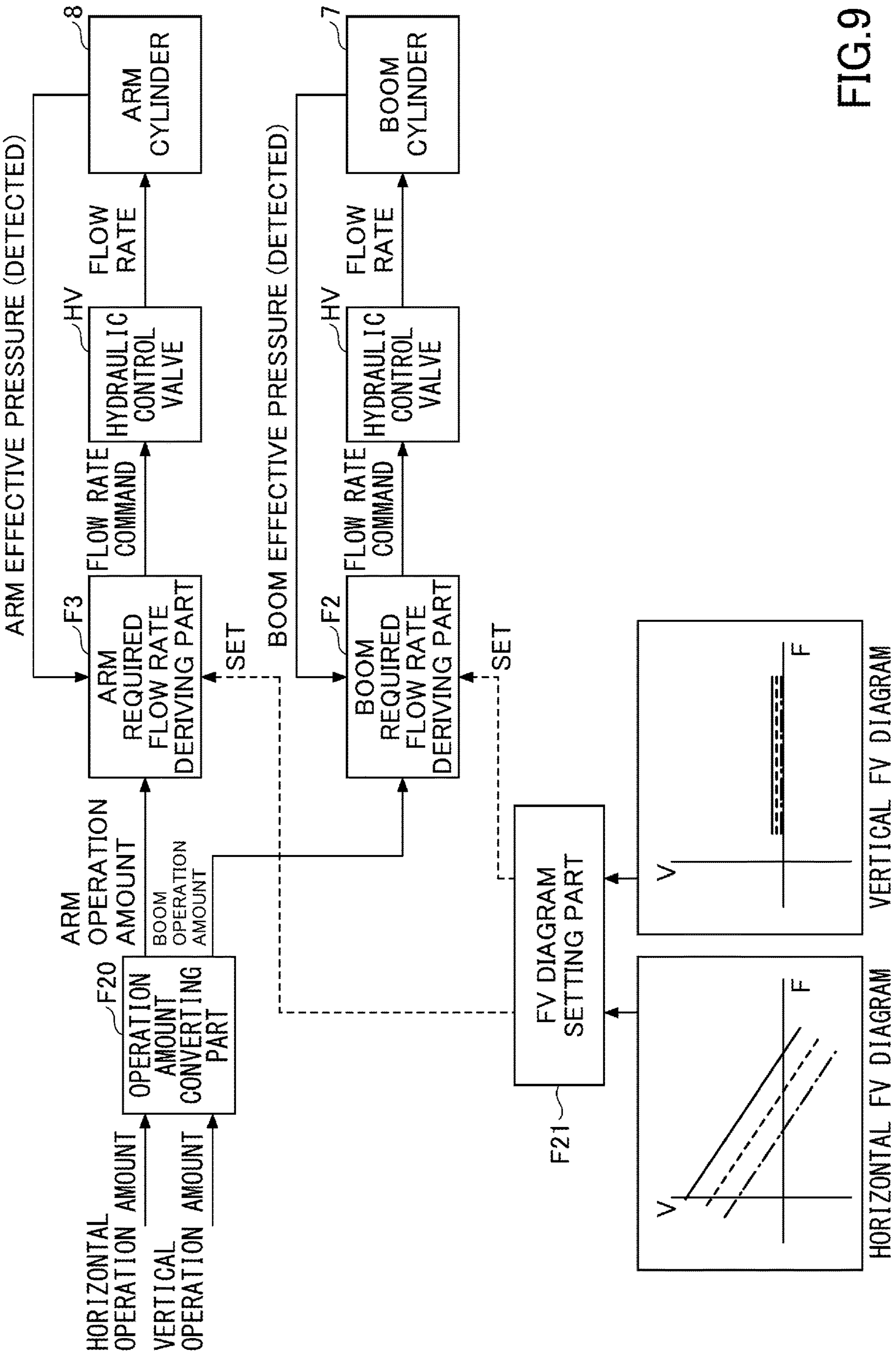
FIG. 9 is a diagram illustrating yet another example flow of control for the movement of the shovel.

Next, yet another example flow of control for the movement of the shovel 100 will be described with reference to FIG. 9. FIG. 9 is a diagram illustrating yet another example flow of control for the movement of the shovel 100. This flow of control is executed by the controller 30.

Specifically, the example illustrated in FIG. 9 illustrates a flow of control for the movement of the shovel 100 configured to use a horizontal operation lever and a vertical operation lever to horizontally and vertically move an end attachment attached to the tip of the arm 5. The end attachment may be a bucket, a grapple, a lifting magnet, a breaker, or the like. In the example illustrated in FIG. 9, the end attachment is the bucket 6.

An operation amount converting part F20 is configured to convert input operation amounts into output operation amounts. In the example illustrated in FIG. 9, the input operation amounts are a horizontal operation amount and a vertical operation amount, and the output operation amounts are an arm operation amount and a boom operation amount.

The horizontal operation amount is an operation amount relating to an operation for moving the position of a predetermined portion of the attachment (hereinafter referred to as a "control target position") in the horizontal direction (front-rear direction). The vertical operation amount is an operation amount relating to an operation for moving the control target position in the vertical direction (up-down direction). The control target position is, for example, the position of a bucket pin that couples the arm 5 to the bucket 6

For example, the operator can move the control target position horizontally forward by tilting the horizontal operation lever forward, and can move the control target position horizontally backward by tilting the horizontal operation lever backward. In addition, the operator can move the control target position vertically downward by tilting the vertical operation lever forward, and can move the control target position vertically upward by tilting the vertical operation lever backward.

Specifically, upon receiving a horizontal operation amount as an input, the operation amount converting part F20 calculates a combination of an arm operation amount and a boom operation amount required to move the control target position horizontally. Upon receiving a vertical operation amount as an input, the operation amount converting part F20 calculates a combination of an arm operation amount and a boom operation amount required to move the control target position vertically. Upon simultaneously receiving a horizontal operation amount and a vertical operation amount as inputs, the operation amount converting part F20 calculates a combination of an arm operation amount and a boom operation amount required to move the control target position diagonally (simultaneously move the control target position horizontally and vertically). Then, the operation amount converting part F20 outputs the calculated arm operation amount to the arm required flow rate deriving part F3, and outputs the calculated boom operation amount to the boom required flow rate deriving part F2.

An FV diagram setting part F21 is configured to set FV diagrams (a boom FV diagram and an arm FV diagram) used by the boom required flow rate deriving part F2 and the arm required flow rate deriving part F3, respectively, based on a horizontal FV diagram relating to a horizontal operation amount and a vertical FV diagram relating to a vertical operation amount.

The horizontal FV diagram is a database (reference table) that stores a correspondence relationship among a horizontal operation amount, thrust F (horizontal thrust), and a required flow rate V (horizontal required flow rate) in a referable manner. The vertical FV diagram is a database (reference table) that stores a correspondence relationship among a vertical operation amount, thrust F (vertical thrust), and a required flow rate V (vertical required flow rate) in a referable manner.

In the example illustrated in FIG. 9, the horizontal FV diagram is configured to have characteristics in which the horizontal movement speed of the control target position changes at a relatively high response speed in accordance with the horizontal operation amount and the horizontal thrust. In addition, the vertical FV diagram is configured to have characteristics in which, regardless of the magnitude of the vertical operation amount, the vertical moving speed hardly changes even when the vertical thrust changes. By using such characteristics, the operator can easily and smoothly move the end attachment horizontally in the front-rear direction without substantially changing the height of the end attachment.

The FV diagram setting part F21 sets the arm FV diagram and the boom FV diagram such that the characteristics represented by the horizontal FV diagram and the vertical FV diagram are achieved.

The boom required flow rate deriving part F2 calculates a flow rate command in a similar manner to that described with reference to FIG. 4, and outputs the calculated flow rate command to a hydraulic control valve HV. Specifically, the boom required flow rate deriving part F2 calculates boom thrust from a boom effective pressure calculated based on the outputs of the pressure sensors S4B and S4R. Then, the boom required flow rate deriving part F2 calculates a flow rate command based on the calculated boom thrust, the boom operation amount calculated by the operation amount converting part F20, and the boom FV diagram set by the FV diagram setting part F21. Then, the boom required flow rate deriving part F2 outputs the flow rate command to at least one of the hydraulic control valve HV3, the hydraulic control valve HV4, the hydraulic control valve HV15, and the hydraulic control valve HV16 associated with the boom cylinder 7. More strictly, the boom required flow rate deriving part F2 outputs the flow rate command to at least one of the solenoid valve EV3, the solenoid valve EV4, the solenoid valve EV15, and the solenoid valve EV16. The same applies to the arm required flow rate deriving part F3.

Figure 10A:
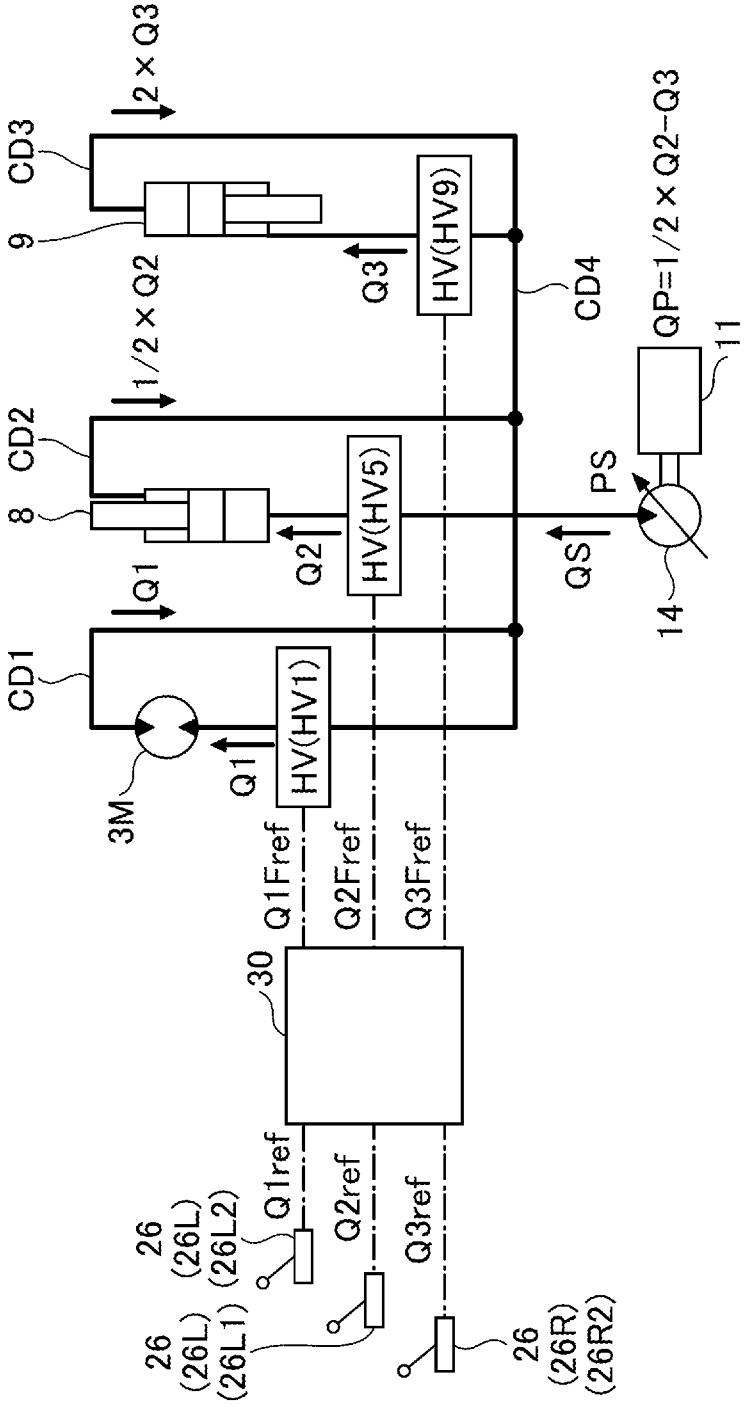
FIG. 10A is a schematic diagram illustrating a flow of another process executed by the controller.
Figure 10B:
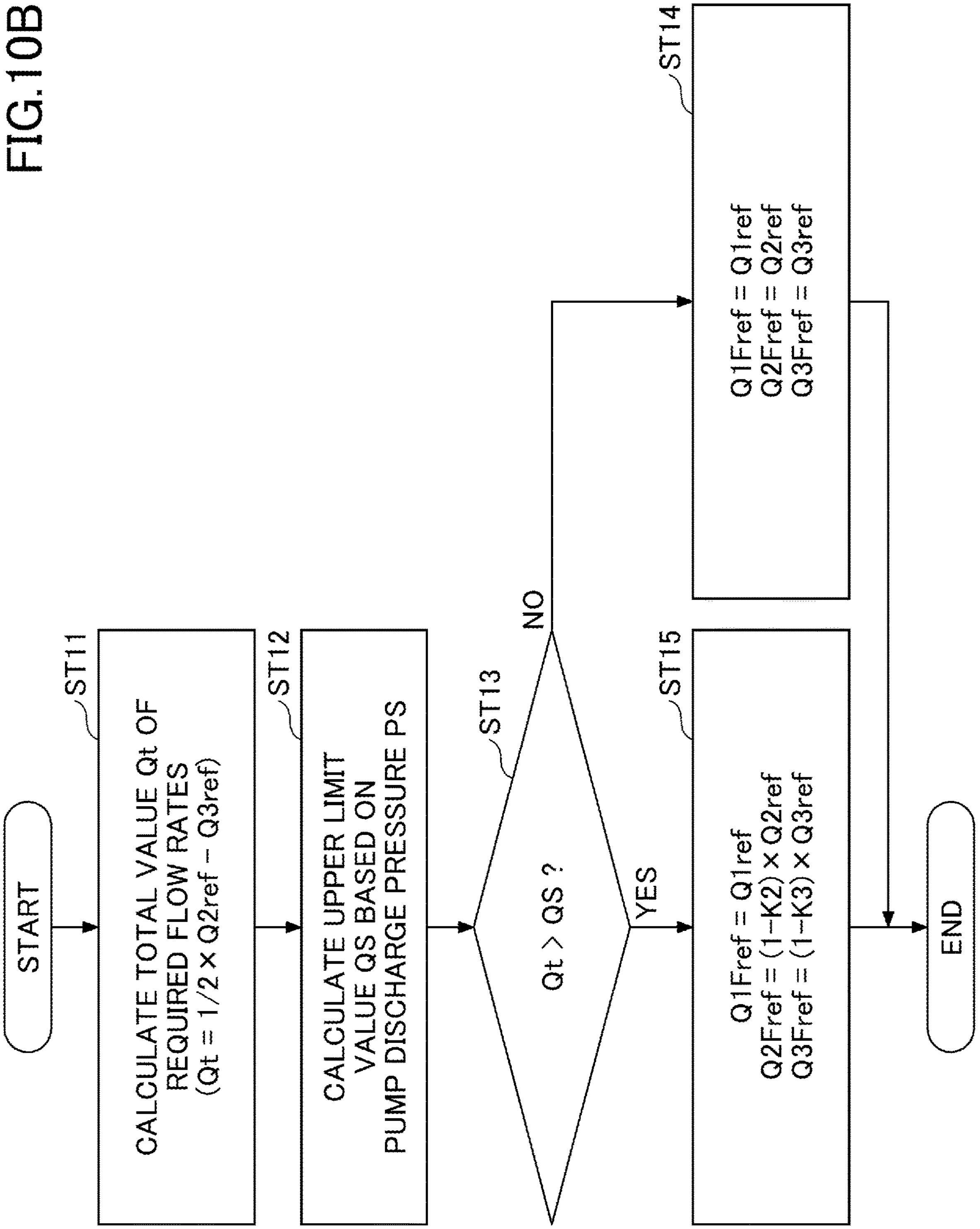
FIG. 10B is a flowchart illustrating the flow of the other process executed by the controller.

Next, another process executed by the flow rate command generating part F1 will be described with reference to FIG. 10A and FIG. 10B. FIG. 10A and FIG. 10B are diagrams illustrating the flow of the other process executed by the flow rate command generating part F1. Specifically, FIG. 10A is a schematic diagram illustrating the flow of the other process executed by the flow rate command generating part F1. FIG. 10B is a flowchart illustrating the 15 flow of the other process executed by the flow rate command generating part F1.

The example illustrated in FIG. 10A and FIG. 10B differs from the example illustrated in FIGS. 6A and 6B, in that hydraulic oil flowing out of the outflow port of the swing hydraulic motor 3M during swing deceleration is re-supplied to the inflow port of the swing hydraulic motor 3M, hydraulic oil flowing out of the rod-side oil chamber of the arm cylinder 8 is re-supplied to the bottom-side oil chamber the arm cylinder 8, and hydraulic oil flowing out of the bottom-side oil chamber of the bucket cylinder 9 is returned to the bottom-side oil chamber of the arm cylinder 8.

In the example illustrated in FIG. 10A and FIG. 10B, the operator operates the operation device 26 (the left operation lever 26L and the right operation lever 26R) installed in the cabin 10 to simultaneously move the swing hydraulic motor 3M, the arm cylinder 8, and the bucket cylinder 9. Specifically, the operator simultaneously performs a counterclockwise swing operation, an arm closing operation, and a bucket opening operation.

The left operation lever 26L is configured to function as the arm operation lever 26L1 when tilted in the front-rear direction and is configured to function as the swing operation lever 26L2 when tilted in the left-right direction. Further, the right operation lever 26R is configured to function as the boom operation lever 26R1 when tilted in the front-rear direction and is configured to function as the bucket operation lever 26R2 when tilted in the left-right direction.

Further, in the example illustrated in FIG. 10A and FIG. 10B, a hydraulic circuit is configured such that hydraulic oil flows into the inflow port of the swing hydraulic motor 3M at a flow rate Q1 corresponding to a pre-adjustment swing required flow rate Q1ref, and the hydraulic oil flows out of the outflow port of the swing hydraulic motor 3M at the flow rate Q1 corresponding to the pre-adjustment swing required flow rate Q1ref. Further, the hydraulic circuit is configured such that the hydraulic oil flowing out of the outflow port of the swing hydraulic motor 3M is re-supplied (flows) into the inflow port of the swing hydraulic motor 3M through a differential conduit (a regenerative conduit CD1). When the hydraulic oil is re-supplied, the flow rate of the hydraulic oil flowing into the inflow port of the swing hydraulic motor 3M is equivalent to the flow rate of the hydraulic oil flowing out of the outflow port of the swing hydraulic motor 3M. Therefore, the flow rate of the hydraulic oil supplied from the hydraulic pump 14 into the swing hydraulic motor 3M becomes zero.

Further, in the example illustrated in FIG. 10A and FIG. 10B, the hydraulic circuit is configured such that the hydraulic oil flows into the rod-side oil chamber of the bucket cylinder 9 at a flow rate Q3 corresponding to a pre-adjustment bucket required flow rate Q3ref, and the hydraulic oil flows out of the bottom-side oil chamber of the bucket cylinder 9 at a flow rate (2×Q3) corresponding to twice the pre-adjustment bucket required flow rate Q3ref. Further, the hydraulic circuit is configured such that the hydraulic oil flowing out of the bottom-side oil chamber of the bucket cylinder 9 is re-supplied to (flows into) the rod-side oil chamber of the bucket cylinder 9 through a differential conduit (a regenerative conduit CD3) and is returned to (flows into) the bottom-side oil chamber of the arm cylinder 8 through a regenerative conduit CD4. When the hydraulic oil is re-supplied, the flow rate of the hydraulic oil flowing into the rod-side oil chamber of the bucket cylinder 9 is equivalent to a fraction (Q3) of the flow rate of the hydraulic oil flowing out of the bottom-side oil chamber of the bucket cylinder 9. Further, when the hydraulic oil is returned, a fraction of the flow rate of the hydraulic oil flowing into the bottom-side oil chamber of the arm cylinder 8 is equivalent to the remaining fraction (2×Q3−Q3=Q3) of the flow rate of the hydraulic oil flowing out of the bottom-side oil chamber of the bucket cylinder 9. Therefore, the flow rate of the hydraulic oil supplied from the hydraulic pump 14 into the bucket cylinder 9 becomes zero.

Further, in the example illustrated in FIG. 10A and FIG. 10B, the hydraulic circuit is configured such that the hydraulic oil flows into the bottom-side oil chamber of the arm cylinder 8 at a flow rate Q2 corresponding to a pre-adjustment arm required flow rate Q2ref, and the hydraulic oil flows out of the rod-side oil chamber of the arm cylinder 8 at a flow rate (½×Q2) corresponding to one-half of the pre-adjustment arm required flow rate Q2ref. Further, the hydraulic circuit is configured such that the hydraulic oil flowing out of the rod-side oil chamber of the arm cylinder 8 is re-supplied to (flows into) the bottom-side oil chamber of the arm cylinder 8 through a differential conduit (a regenerative conduit CD2). When the hydraulic oil is re-supplied, one-half of the flow rate of the hydraulic oil flowing into the bottom-side oil chamber of the arm cylinder 8 is equivalent to the flow rate of the hydraulic oil flowing out of the rod-side oil chamber of the arm cylinder 8. Further, when the hydraulic oil is returned, a fraction of the flow rate of the hydraulic oil flowing into the bottom-side oil chamber of the arm cylinder 8 is equivalent to the flow rate Q3 of the hydraulic oil returned from the bottom-side oil chamber of the bucket cylinder 9. Therefore, a flow rate QP of the hydraulic oil supplied from the hydraulic pump 14 into the bottom-side oil chamber of the arm cylinder 8 becomes (Q2−½×Q2−Q3).

The above-described process for calculating the flow rates of the hydraulic oil supplied from the hydraulic pump 14 to the hydraulic actuators is implemented by a regeneration control part F13 illustrated in FIG. 4.

The pre-adjustment swing required flow rate Q1ref is a value calculated from a swing operation amount. Similarly, the pre-adjustment arm required flow rate Q2ref is a value calculated from an arm operation amount, and the pre-adjustment bucket required flow rate Q3ref is a value calculated from a bucket operation amount.

In order to control the flow of the hydraulic oil in the hydraulic circuit as described above, the flow rate command generating part F1 first calculates a total value Qt of required flow rates (step ST11). In the example illustrated in FIG. 10A and FIG. 10B, the total value Qt of the required flow rates is a value obtained by subtracting the pre-adjustment bucket required flow rate Q3ref from a flow rate corresponding to one-half of the pre-adjustment arm required flow rate Q2ref. That is, the total value Qt of the required flow rates corresponds to the flow rate QP (=Q2−½×Q2−Q3) of the hydraulic oil supplied from the hydraulic pump 14 into the bottom-side oil chamber of the arm cylinder 8.

Subsequently, the flow rate command generating part F1 calculates an upper limit value QS of a pump discharge quantity (step ST12).

In the present embodiment, the flow rate command generating part F1 calculates the upper limit value QS of the pump discharge quantity based on a pump discharge pressure PS, such that the absorbed power (absorbed horsepower) of the hydraulic pump 14 derived by multiplying the pump discharge pressure by the pump discharge quantity is less than or equal to the maximum power (maximum horsepower) of the engine 11. Note that the flow rate command generating part F1 may use, as the upper limit value QS, an upper limit value of a pump discharge quantity that is mechanically determined by the structure of the hydraulic pump 14.

Subsequently, the flow rate command generating part F1 compares the total value Qt of the required flow rates with the upper limit value QS of the pump discharge quantity (step ST13). If the upper limit value QS of the pump discharge quantity is calculated based on the maximum output of the engine 11, this comparison step is performed by the maximum horsepower comparison part F11 illustrated in FIG. 4. If the upper limit value QS of the pump discharge quantity is determined by mechanical restrictions of the hydraulic pump 14, this comparison step is performed by the maximum flow rate comparison part F12 illustrated in FIG. 4.

If the total value Qt of the required flow rates is less than or equal to the upper limit value QS of the pump discharge quantity (NO in step ST13), the flow rate command generating part F1 sets the pre-adjustment swing required flow rate Q1ref as a swing required flow rate Q1Fref, sets the pre-adjustment arm required flow rate Q2ref as an arm required flow rate Q2Fref, and sets the pre-adjustment bucket required flow rate Q3ref as a bucket required flow rate Q3Fref (step ST14).

The swing swing required flow rate Q1Fref is a current command to be output to the solenoid valve EV1 corresponding to the hydraulic control valve HV1. Specifically, the swing required flow rate Q1Fref is a value set such that the flow rate of the hydraulic oil flowing into the left port of the swing hydraulic motor 3M through the hydraulic control valve HV1 functioning as the meter-in valve becomes a value Q1.

The arm required flow rate Q2Fref is a current command to be output to the solenoid valve EV5 corresponding to the hydraulic control valve HV5. Specifically, the arm required flow rate Q2Fref is a value set such that the flow rate of the hydraulic oil flowing into the bottom-side oil chamber of the arm cylinder 8 through the hydraulic control valve HV5 functioning as the meter-in valve becomes a value Q2.

The bucket required flow rate Q3Fref is a current command to be output to the solenoid valve EV9 corresponding to the hydraulic control valve HV9. Specifically, the bucket required flow rate Q3Fref is a value set such that the flow rate of the hydraulic oil flowing into the rod-side oil chamber of the bucket cylinder 9 through the hydraulic control valve HV9 functioning as the meter-in valve becomes a value Q3.

In the example illustrated in FIG. 10A and FIG. 10B, the flow rate QP of the hydraulic oil supplied from the hydraulic pump 14 to the hydraulic actuator is less than or equal to the upper limit value QS of the pump discharge quantity. That is, a value (½×Q2−Q3) obtained by subtracting the sum of the value (½×Q2) of the flow rate of the hydraulic oil flowing out of the rod-side oil chamber of the arm cylinder 8 and the value (2×Q3) of the flow rate of the hydraulic oil flowing out of the bottom-side oil chamber of the bucket cylinder 9 from the sum of the value Q2 of the flow rate of the hydraulic oil flowing into the bottom-side oil chamber of the arm cylinder 8 and the value Q3 of the flow rate of the hydraulic oil flowing into the rod-side oil chamber of the bucket cylinder 9 is less than or equal to the upper limit value QS of the pump discharge quantity.

Conversely, if the total value Qt of the required flow rates exceeds the upper limit value QS of the pump discharge quantity (YES in step ST13), the flow rate command generating part F1 sets the pre-adjustment swing required flow rate Q1ref as a swing required flow rate Q1Fref, sets a value obtained by multiplying the pre-adjustment arm required flow rate Q2ref by a value (1×K2) as an arm required flow rate Q2Fref, and sets a value obtained by multiplying the pre-adjustment bucket required flow rate Q3ref by a value (1−K3) as a bucket required flow rate Q3Fref (step ST15). The value K2 and the value K3 are values set such that Equation (7) below is satisfied.

$$QS=\frac{1}{2}\times(1-A2)\times Q2\mathrm{ref}-(1-A3)\times Q3\mathrm{ref} \quad (7)$$

For example, each of the value K2 and the value K3 may be a value K (=(Qt−QS)/Qt) of the ratio of a shortfall (Qt−QS) to the total value Qt of the required flow rates. The shortfall is a value obtained by subtracting the upper limit value QS of the pump discharge quantity from the total value Qt of the required flow rates.

In this case, if the value K of the ratio of the shortfall to the total value Qt of the required flow rates is 0.1, the arm required flow rate Q2Fref is a value obtained by multiplying the pre-adjustment arm required flow rate Q2ref by 0.9. Similarly, the bucket required flow rate Q3Fref is a value obtained by multiplying the pre-adjustment bucket required flow rate Q3ref by 0.9.

One effect of the above configuration is that the arm closing speed and the bucket opening speed can be changed (reduced) at the same ratio even when the total value Qt of the required flow rates exceeds the upper limit value QS of the pump discharge quantity. That is, one effect of the above configuration is that, for example, any one of the arm closing speed and the bucket opening speed can be prevented from being largely changed (reduced) as compared with the other speed.

In the example illustrated in FIG. 10A and FIG. 10B, even when the total value Qt of the required flow rates exceeds the upper limit value QS of the pump discharge quantity, the flow rate command generating part F1 sets the pre-adjustment swing required flow rate Q1ref as the swing required flow rate Q1Fref. That is, the controller 30 is configured not to restrict the movement of the swing hydraulic motor 3M. However, the flow rate command generating part F1 may restrict the movement of the swing hydraulic motor 3M in the same manner as restricting the movements of the arm cylinder 8 and the bucket cylinder 9. For example, when the ratio K of the shortfall to the total value Qt of the required flow rates is 0.1, the flow rate command generating part F1 may set a value obtained by multiplying the pre-adjustment swing required flow rate Q1ref by 0.9 as the swing required flow rate Q1Fref. One effect of this configuration is that the counterclockwise swing speed, the arm closing speed, and the bucket opening speed can be changed (reduced) at the same ratio.

As described above, the shovel 100 according to an embodiment of the present disclosure includes hydraulic actuators configured to move in response to movement commands, the pressure sensors S1 to S6 configured to detect pressures of hydraulic oil in the hydraulic actuators, meter-in valves (some of the plurality of hydraulic control valves HV) in correspondence with the hydraulic actuators, meter-out valves (some of the plurality of hydraulic control valves HV) in correspondence with the hydraulic actuators, and the controller 30 serving as a control device having a plurality of output characteristics set for each of the hydraulic actuators. The controller is configured to calculate a required flow rate corresponding to a movement command, based on an output characteristic corresponding to the movement command from among the plurality of output characteristics. The output characteristics represent a correspondence relationship among the movement command, the pressure of hydraulic oil in each of the hydraulic actuators, and the required flow rate. One effect of this configuration is that the movements of the hydraulic actuators can be more flexibly controlled.

The shovel 100 may include the operation device 26 serving as a movement command generating device configured to generate movement command values (values of operation amounts) for the hydraulic actuators. The controller 30 may be configured to calculate a required flow rate based on predetermined output characteristics, a value of an operation amount generated by the operation device 26, and a detection value of any of the pressure sensors S1 to S6. The predetermined output characteristics are characteristics represented by a FV diagram, and represent a correspondence relationship among a movement command value (the value of the operation amount), the pressure of hydraulic oil in a corresponding hydraulic actuator, and the required flow rate that is the flow rate of hydraulic oil to be supplied to the hydraulic actuator. The predetermined output characteristics may be expressed by a mathematical expression. The pressure sensors S1 to S6, the meter-in valves, and the meter-out valves are provided in correspondence with the plurality of hydraulic actuators. The controller 30 may be configured to calculate required flow rates for the plurality of respective hydraulic actuators.

One effect of the above configuration is that the movements of the hydraulic actuators can be more flexibly controlled. This is because the meter-in valves and the meter-out valves are individually provided for the hydraulic actuators. Note that the hydraulic actuators may include hydraulic cylinders such as the boom cylinder 7, the arm cylinder 8, and the bucket cylinder 9. Any of the pressure sensors S1 to S6 may be configured to detect bottom-side pressures, which are pressures of hydraulic oil in the bottom-side oil chambers of the hydraulic cylinders, and rod-side pressures, which are pressures of hydraulic oil in the rod-side oil chambers of the hydraulic cylinders. The controller 30 may be configured to calculate a required flow rate based on output characteristics, a value of an operation amount generated by the operation device 26, and a differential pressure between a bottom-side pressure and a rod-side pressure.

Specifically, the shovel 100 includes the boom cylinder 7, the pressure sensor S4 configured to detect the pressure of hydraulic oil in the boom cylinder 7, the hydraulic control valve HV3 configured to function as the meter-in valve associated with the boom cylinder 7 when the boom cylinder 7 extends, the hydraulic control valve HV4 configured to function as the meter-out valve associated with the boom cylinder 7 when the boom cylinder 7 extends, the boom operation lever 26R1 configured to generate a movement command value (a value of a boom raising operation amount) for the boom cylinder 7, a boom FV diagram representing a correspondence relationship between the value of the boom raising operation amount and the pressure of the hydraulic oil in the boom cylinder 7, and the controller 30 configured to calculate a boom required flow rate, which is the flow rate of hydraulic oil to be supplied to the boom cylinder 7, based on the boom raising operation amount generated by the boom operation lever 26R1 and a detection value of the pressure sensor S4. The pressure sensor S4 includes the pressure sensor S4B configured to detect a bottom-side pressure that is the pressure of hydraulic oil in the bottom-side oil chamber of the boom cylinder 7, and the pressure sensor S4R configured to detect a rod-side pressure that is the pressure of hydraulic oil in the rod-side oil chamber of the boom cylinder 7. With this configuration, since the meter-in valve and the meter-out valve are individually provided for the boom cylinder 7, the movement of the boom cylinder 7 can be more flexibly controlled.

The controller 30 may be configured to calculate thrust based on a differential pressure between a bottom-side pressure and a rod-side pressure. Then, the controller 30 may be configured to calculate a required flow rate based on a FV diagram, an operation amount generated by the operation device 26, and the thrust.

More specifically, for example, the controller 30 may calculate a boom effective pressure that is a differential pressure between the boom bottom pressure and the boom rod pressure, and calculate boom thrust by multiplying the boom effective pressure by the pressure-receiving area. The boom effective pressure is a value obtained by subtracting a meter-out pressure from a meter-in pressure. Further, the pressure-receiving area is the pressure-receiving area of the piston of the boom cylinder 7. As illustrated in FIG. 4, the controller 30 may be configured to calculate a boom required flow rate based on a boom FV diagram, a value of a boom operation amount, and the value of the boom thrust.

One effect of the above configuration is that, even if the boom operation amount is constant, the boom required flow rate can be changed in accordance with a change in the boom thrust based on preset output characteristics represented by the boom FV diagram, and thus, the boom cylinder 7 can extend and retract more appropriately.

The controller 30 may be configured to change output characteristics in accordance with the movement content of the shovel 100, which is determined based on a value of an operation amount generated by the operation device 26 and detection values of any of the pressure sensors S1 to S6.

For example, the controller 30 may determine the operation content of the shovel 100 based on a value of an operation amount generated by the operation device 26 and detection values of any of the pressure sensors S1 to S6. The movement content of the shovel 100 is, for example, a boom raising movement, a boom lowering movement, a swing movement, an arm closing movement, an arm opening movement, or the like. The movement content of the shovel 100 may be a compaction movement, an aerial movement, or the like. The compaction movement is pressing the bucket 6 against the ground. The aerial movement is the movement of the attachment in a state in which the attachment does not contact the ground.

The controller 30 may change the contents of an FV diagram in accordance with the movement content of the shovel 100. For example, the controller 30 may select and use one FV diagram suitable for the current movement content of the shovel 100 from among a plurality of FV diagrams prepared in advance.

Alternatively, if output characteristics are expressed by a mathematical expression, the controller 30 may change the output characteristics by dynamically changing the contents (a coefficient or the like) of the mathematical expression. For example, the controller 30 may select and use one mathematical expression suitable for the current movement content of the shovel 100 from a plurality of mathematical expressions prepared in advance.

Alternatively, the controller 30 may determine whether the movement of the shovel 100 is an aerial movement based on a value of an operation amount generated by the operation device 26 and detection values of the pressure sensors S1 to S6, and may change output characteristics in accordance with the determination result.

With this configuration, output characteristics suitable for the movement content of the shovel 100 can be achieved. Thus, both operability (controllability) and energy saving of the shovel 100 can be achieved at a high level.

In addition, the controller 30 may calculate a pump flow rate, which is the flow rate of hydraulic oil to be discharged from the hydraulic pump 14, based on a value of an operation amount generated by the operation device 26. For example, as illustrated in FIG. 6A and FIG. 6B, when the swing hydraulic motor 3M, the boom cylinder 7, and the arm cylinder 8 are simultaneously moved, the controller 30 may calculate a total value Qt of a swing required flow rate (pre-adjustment swing required flow rate Q1ref), a boom required flow rate (pre-adjustment boom required flow rate Q2ref), and an arm required flow rate (pre-adjustment arm required flow rate Q3ref) as a pump flow rate. In addition, the controller 30 may be configured to compare the pump flow rate with a maximum flow rate (an upper limit value QS) of hydraulic oil dischargeable from the hydraulic pump 14.

With this configuration, the controller 30 can determine whether the pump flow rate exceeds the upper limit value QS. Therefore, the controller 30 can change the driving method of the shovel 100 between when the pump flow rate exceeds the upper limit value QS and when the pump flow rate is less than or equal to the upper limit value QS. For example, when the pump flow rate exceeds the upper limit value QS, the controller 30 can decelerate a plurality of hydraulic actuators, which are to be simultaneously moved, at the same deceleration rate. That is, the controller 30 can prevent the deceleration rate of one hydraulic actuator among the plurality of hydraulic actuators from being significantly different from the deceleration rate of another hydraulic actuator.

The shovel 100 may further include a differential circuit that includes a differential conduit connecting an inflow conduit of a hydraulic actuator and an outflow conduit of the hydraulic actuator. For example, in the example illustrated in FIG. 10A and FIG. 10B, the shovel 100 includes a difference circuit that includes the differential conduit (regenerative conduit CD1) connecting the inflow conduit and the outflow conduit of the swing hydraulic motor 3M, a difference circuit that includes the differential conduit (regenerative conduit CD2) connecting the bottom-side oil chamber and the rod-side oil chamber of the arm cylinder 8, and a difference circuit that includes the differential conduit (regenerative conduit CD3) connecting the bottom-side oil chamber and the rod-side oil chamber of the bucket cylinder 9. The controller 30 may be configured to calculate a pump flow rate based on values of operation amounts generated by the operation device 26 and the flow rates of hydraulic oil flowing in the differential circuits.

The shovel 100 may further include a regenerative circuit that includes a regenerative conduit connecting one of a plurality of hydraulic actuators and another one of the plurality of hydraulic actuators. For example, in the example illustrated in FIG. 10A and FIG. 10B, the shovel 100 includes a regenerative circuit that includes the regenerative conduit CD4 connecting the bottom-side oil chamber of the bucket cylinder 9 and the bottom-side oil chamber of the arm cylinder 8. The controller 30 may be configured to calculate a pump flow rate based on values of operation amounts generated by the operation device 26 and the flow rate of hydraulic oil flowing in the regenerative circuit.

For example, in the example illustrated in FIG. 10A and FIG. 10B, when the swing hydraulic motor 3M, the arm cylinder 8, and the bucket cylinder 9 are simultaneously moved, the controller 30 calculates, as the pump flow rate, the total value Qt obtained by subtracting the flow rate (Q3ref) corresponding to the bucket required flow rate (pre-adjustment bucket required flow rate Q3ref) from the flow rate (½×Q2ref) corresponding to one-half of the arm required flow rate (pre-adjustment arm required flow rate Q2ref). In addition, the controller 30 is configured to compare the pump flow rate with the maximum flow rate (upper limit value QS) of hydraulic oil dischargeable from the hydraulic pump 14.

With this configuration, even when the hydraulic circuit installed in the shovel 100 includes at least one of a differential circuit and a regenerative circuit, the controller 30 can achieve the same effects as described above. For example, when the pump flow rate exceeds the upper limit value QS, the controller 30 can decelerate a plurality of hydraulic actuators to be simultaneously moved at the same deceleration rate.

If a pump flow rate exceeds a maximum flow rate, the controller 30 may be configured to reduce the pump flow rate and a required flow rate. For example, in the example illustrated in FIG. 6A and FIG. 6B, if the total value Qt serving as the pump flow rate exceeds the upper limit value QS serving as the maximum flow rate, the controller 30 reduces the pump flow rate (total value Qt) to the maximum flow rate (upper limit value QS). That is, the controller 30 reduces the total value Qt of the pre-adjustment swing required flow rate Q1ref, the pre-adjustment boom required flow rate Q2ref, and the pre-adjustment arm required flow rate Q3ref to the maximum flow rate (upper limit value QS). Further, if the hydraulic pump 14 includes a plurality of hydraulic pumps, the controller 30 may be configured to acquire a pump flow rate and a maximum flow rate for each of the hydraulic pumps, and control a pump discharge quantity for each of the hydraulic pumps.

Note that a maximum flow rate may be determined based on, for example, the maximum output of a drive source such as the engine 11 and the discharge pressure of the hydraulic pump 14. The discharge pressure of the hydraulic pump 14 may be detected by, for example, the pressure sensor S7.

With the above configuration, the controller 30 can cause hydraulic oil to flow into a plurality of hydraulic actuators with an excellent balance while preventing an excessive load from being applied to the drive source.

Further, the controller 30 may be configured to calculate a meter-in flow rate, which is the flow rate of hydraulic oil to pass through a meter-in valve, and a meter-out flow rate, which is the flow rate of hydraulic oil to pass through a meter-out valve, based on a value of an operation amount generated by the operation device 26. Further, the controller 30 may be configured to calculate the opening area of the meter-in valve based on the meter-in flow rate and a detection value of a pressure sensor, and calculate the opening area of the meter-out valve based on the meter-out flow rate and a detection value of a pressure sensor.

For example, in the example illustrated in FIG. 4, the boom raising movement is performed. Thus, the hydraulic control valve HV3 connected to the bottom-side oil chamber of the boom cylinder 7 functions as the meter-in valve, and the hydraulic control valve HV4 connected to the rod-side oil chamber of the boom cylinder 7 functions as the meter-out valve. Therefore, the controller 30 calculates a meter-in flow rate, which is the flow rate of hydraulic oil to pass through the hydraulic control valve HV3, and a meter-out flow rate, which is the flow rate of hydraulic oil to pass through the hydraulic control valve HV4. In addition, the controller 30 calculates the opening area (target value) of the meter-in valve (hydraulic control valve HV3) based on the meter-in flow rate, which is the flow rate of the hydraulic oil to pass through the hydraulic control valve HV3, and a detection value of the pressure sensor S4B, and calculates the opening area (target value) of the meter-out valve (hydraulic control valve HV4) based on the meter-out flow rate, which is the flow rate of the hydraulic oil to pass through the hydraulic control valve HV4, and a detection value of the pressure sensor S4R. Then, the controller 30 uses the solenoid valve EV3 to adjust the pilot pressure of the hydraulic control valve HV3, such that the calculated opening area (target value) of the meter-in valve (hydraulic control valve HV3) becomes the same as the actual opening area of the meter-in valve (hydraulic control valve HV3). Similarly, the controller 30 uses the solenoid valve EV4 to adjust the pilot pressure of the hydraulic control valve HV4, such that the calculated opening area (target value) of the meter-out valve (hydraulic control valve HV4) becomes the same as the actual opening area of the meter-out valve (hydraulic control valve HV4).

The same applies to the hydraulic control valve HV16 that functions as the meter-in valve and the hydraulic control valve HV15 that functions as the meter-out valve. Further, the same applies to the meter-in valves and the meter-out valves associated with the arm cylinder 8, the meter-in valve and the meter-out valves associated with the bucket cylinder 9, and the like.

The controller 30 may be configured to control the discharge pressure of the hydraulic pump based on the highest value among detection values of a plurality of pressure sensors disposed downstream of a plurality of meter-in valves connected to the hydraulic pump.

For example, when a boom raising movement, an arm closing movement, and a bucket closing movement are simultaneously performed, the controller 30 controls the discharge pressure of the second hydraulic pump 14B based on the highest value among detection values of three pressure sensors disposed downstream of three meter-in valves connected to the second hydraulic pump 14B. The three meter-in valves are the hydraulic control valve HV16 that functions as the meter-in valve associated with the boom cylinder 7, the hydraulic control valve HV14 that functions as the meter-in valve associated with the arm cylinder 8, and the hydraulic control valve HV12 that functions as the meter-in valve associated with the bucket cylinder 9. The three pressure sensors are the pressure sensor S4B that detects the boom bottom pressure, the pressure sensor S5B that detects the arm bottom pressure, and the pressure sensor S6B that detects the bucket bottom pressure.

Specifically, the controller 30 controls the pump discharge quantity of the second hydraulic pump 14B such that the discharge pressure of the second hydraulic pump 14B is higher than the highest value of the detection values of the three pressure sensors by a predetermined value.

With the above configuration, the controller 30 can operate the hydraulic actuators with the minimum required pump discharge pressure, and can achieve both operability (controllability) and energy saving of the shovel 100 at a high level.

Although the embodiments of the present invention have been described in detail above, the present invention is not limited to the above-described embodiments and embodiments described below. Variations, replacements, and the like may be applied to the above-described embodiments and embodiments described below without departing from the scope of the present invention. Furthermore, the separately described features can be suitably combined as long as no technical contradiction occurs.

For example, in the above-described embodiments, the hydraulic circuit is configured such that the meter-in valve that controls hydraulic oil supplied to the left traveling hydraulic motor 1M and the meter-out valve that controls hydraulic oil discharged from the left traveling hydraulic motor 1M are provided separately. However, the meter-in valve and the meter-out valve are not necessarily provided separately for the left traveling hydraulic motor 1M. For example, the hydraulic circuit may be configured such that hydraulic oil supplied to the left traveling hydraulic motor 1M and hydraulic oil discharged from the left traveling hydraulic motor 1M are simultaneously controlled by one spool valve. The same applies to the right traveling hydraulic motor 2M.

What is claimed is:

1. A shovel comprising:
- a plurality of hydraulic actuators each configured to move in response to a movement command;
- a pressure sensor configured to detect a pressure of hydraulic oil in each of the hydraulic actuators;
- a meter-in valve in correspondence with each of the hydraulic actuators;
- a meter-out valve in correspondence with each of the hydraulic actuators; and
- a controller having different output characteristics set for each of the hydraulic actuators,
- wherein the controller is configured to calculate a required flow rate corresponding to the movement command, based on an output characteristic corresponding to the movement command from among the output characteristics.

2. The shovel according to claim 1, wherein the output characteristics represent a correspondence relationship among the movement command, the pressure of the hydraulic oil in each of the hydraulic actuators, and the required flow rate, and
- the pressure sensor, the meter-in valve, and the meter-out valve are provided in correspondence with each of the hydraulic actuators.

3. The shovel according to claim 1, wherein a hydraulic actuator of the plurality of hydraulic actuators is a hydraulic cylinder,
- the pressure sensor is configured to detect a bottom-side pressure that is a pressure of hydraulic oil in a bottom-side oil chamber of the hydraulic cylinder, and detect a rod-side pressure that is a pressure of hydraulic oil in a rod-side oil chamber of the hydraulic cylinder, and
- the controller is configured to calculate the required flow rate based on the output characteristics, the movement command, and a differential pressure between the bottom-side pressure and the rod-side pressure.

4. The shovel according to claim 3, wherein the controller is configured to
- calculate thrust based on the differential pressure between the bottom-side pressure and the rod-side pressure, and
- calculate the required flow rate based on the output characteristics, the movement command, and the thrust.

5. The shovel according to claim 1, wherein the controller is configured to change the output characteristics in accordance with a movement content of the shovel, the movement content being determined based on the movement command and a detection value of the pressure sensor.

6. The shovel according to claim 1, wherein the controller is configured to make a determination as to whether a movement of the shovel is an aerial movement based on the movement command and a detection value of the pressure sensor, and change the output characteristics in accordance with a result of the determination.

7. The shovel according to claim 1, further comprising:
- a hydraulic pump; and
- a discharge pressure sensor configured to detect a discharge pressure of the hydraulic pump,
- wherein the pressure sensor, the meter-in valve, and the meter-out valve are provided in correspondence with each of the hydraulic actuators, and
- the controller is configured to
  - calculate, based on the movement command, a meter-in flow rate that is a flow rate of hydraulic oil to pass through the meter-in valve and a meter-out flow rate that is a flow rate of hydraulic oil to pass through the meter-out valve,
  - calculate an opening area of the meter-in valve based on the meter-in flow rate, a detection value of the pressure sensor, and a detection value of the discharge pressure sensor, and
  - calculate an opening area of the meter-out valve based on the meter-out flow rate and a detection value of the pressure sensor.

8. The shovel according to claim 7, wherein the meter-in valve includes a plurality of meter-in valves, the pressure sensor includes a plurality of pressure sensors disposed downstream of the plurality of meter-in valves, and the controller is configured to control the discharge pressure of the hydraulic pump based on a highest value among detection values of the plurality of pressure sensors.

9. The shovel according to claim 7, wherein a hydraulic actuator of the plurality of hydraulic actuators is a boom cylinder, and
- the opening area of the meter-in valve associated with the boom cylinder when the boom cylinder extends is calculated based on the meter-in flow rate into a bottom-side oil chamber of the boom cylinder, the discharge pressure of the hydraulic pump, and a boom bottom pressure.

10. The shovel according to claim 9, wherein the opening area of the meter-out valve associated with the boom cylinder when the boom cylinder extends is calculated based on the meter-out flow rate out of a rod-side oil chamber of the boom cylinder, a hydraulic oil tank pressure, and a boom rod pressure.

11. The shovel according to claim 10, wherein the meter-out flow rate out of the rod-side oil chamber of the boom cylinder is calculated based on the meter-in flow rate into the bottom-side oil chamber of the boom cylinder.

12. The shovel according to claim 1, further comprising:
- a hydraulic pump,
- wherein the pressure sensor, the meter-in valve, and the meter-out valve are provided in correspondence with each of the hydraulic actuators, and
- the controller is configured to
  - compare a pump flow rate that is a flow rate of hydraulic oil to be discharged from the hydraulic pump and that is calculated based on the movement command, with a maximum flow rate of hydraulic oil dischargeable from the hydraulic pump, and
  - calculate the required flow rate that is a flow rate of hydraulic oil to be supplied to each of the hydraulic actuators.

13. The shovel according to claim 12, wherein the pump flow rate is a sum of flow rates of the hydraulic oil to be supplied to the hydraulic actuators.

14. The shovel according to claim 12, further comprising:

a differential circuit that includes a differential conduit connecting an inflow conduit of each of the hydraulic actuators and an outflow conduit of each of the hydraulic actuators, wherein the controller is configured to calculate the pump flow rate based on the movement command and a flow rate of hydraulic oil flowing in the differential circuit.

15. The shovel according to claim 12, further comprising:

a regenerative circuit that includes a regenerative conduit connecting one hydraulic actuator of the plurality of hydraulic actuators and another hydraulic actuator of the plurality of hydraulic actuators, wherein the controller is configured to calculate the pump flow rate based on the movement command and a flow rate of hydraulic oil flowing in the regenerative circuit.

16. The shovel according to claim 12, wherein the controller is configured to reduce the pump flow rate and the required flow rate in a case where the pump flow rate exceeds the maximum flow rate.

17. The shovel according to claim 12, wherein the maximum flow rate is determined based on a maximum output of a drive source and a discharge pressure of the hydraulic pump.

18. A shovel comprising:

a hydraulic pump;

a plurality of hydraulic actuators each configured to move in response to a movement command;

a pressure sensor configured to detect a pressure of hydraulic oil in each of the hydraulic actuators;

a discharge pressure sensor configured to detect a discharge pressure of the hydraulic pump;

a meter-in valve in correspondence with each of the hydraulic actuators;

a meter-out valve in correspondence with each of the hydraulic actuators; and a controller configured to calculate, based on the movement command, a meter-in flow rate that is a flow rate of hydraulic oil to pass through the meter-in valve and a meter-out flow rate that is a flow rate of hydraulic oil to pass through the meter-out valve, wherein the pressure sensor, the meter-in valve, and the meter-out valve are provided in correspondence with each of the hydraulic actuators, and the controller is configured to calculate an opening area of the meter-in valve based on the meter-in flow rate, a detection value of the pressure sensor, and a detection value of the discharge pressure sensor, and calculate an opening area of the meter-out valve based on the meter-out flow rate and a detection value of the pressure sensor.

19. A shovel comprising:

a hydraulic pump;

a plurality of hydraulic actuators each configured to move in response to a movement command;

a pressure sensor configured to detect a pressure of hydraulic oil in each of the hydraulic actuators;

a meter-in valve in correspondence with each of the hydraulic actuators;

a meter-out valve in correspondence with each of the hydraulic actuators; and a controller configured to compare a pump flow rate that is a flow rate of hydraulic oil to be discharged from the hydraulic pump and that is calculated based on the movement command, with a maximum flow rate of hydraulic oil dischargeable from the hydraulic pump, wherein the pressure sensor, the meter-in valve, and the meter-out valve are provided in correspondence with each of the hydraulic actuators, and the controller is configured to calculate a required flow rate that is a flow rate of hydraulic oil to be supplied to each of the hydraulic actuators.

* * * * *